United States Patent
Shimizu et al.

(10) Patent No.: US 8,946,967 B2
(45) Date of Patent: Feb. 3, 2015

(54) ELECTRIC ROTATING MACHINE

(71) Applicant: Yamaha Hatsudoki Kabushiki Kaisha, Shizuoka-Ken (JP)

(72) Inventors: Tsukasa Shimizu, Shizuoka-ken (JP); Haruyoshi Hino, Shizuoka-ken (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 177 days.

(21) Appl. No.: 13/723,195

(22) Filed: Dec. 20, 2012

(65) Prior Publication Data

US 2013/0162096 A1 Jun. 27, 2013

(30) Foreign Application Priority Data

Dec. 22, 2011 (JP) .................. 2011-281393
Oct. 15, 2012 (JP) .................. 2012-227652

(51) Int. Cl.
*H02K 21/02* (2006.01)

(52) U.S. Cl.
CPC .................. *H02K 21/028* (2013.01)
USPC ........................................ 310/209

(58) Field of Classification Search
USPC .................................. 310/191, 209
See application file for complete search history.

(56) References Cited

U.S. PATENT DOCUMENTS

| | | | |
|---|---|---|---|
| 7,550,894 B2 | 6/2009 | Hino et al. | |
| 7,906,844 B2 | 3/2011 | Cui et al. | |
| 8,093,776 B2 | 1/2012 | Hino et al. | |
| 8,148,867 B2 * | 4/2012 | Gieras et al. | 310/209 |
| 2012/0126740 A1 * | 5/2012 | Kauppi | 318/538 |

FOREIGN PATENT DOCUMENTS

| | | |
|---|---|---|
| CN | 1758511 A | 8/2010 |
| CN | 101807836 A | 8/2010 |
| DE | 102 53 950 A1 | 7/2003 |
| EP | 1 670 124 A2 | 6/2006 |

(Continued)

OTHER PUBLICATIONS

English-language translation of Japanese patent document No. JP 2006-191782 dated Jul. 20, 2006; 53 pages total.

(Continued)

*Primary Examiner* — Dang Le
(74) *Attorney, Agent, or Firm* — Rabin & Berdo, P.C.

(57) ABSTRACT

A tooth portion of a stator is divided into first and second tooth portions and in a relatively movable manner between a first position in which a magnetic resistance between the tooth portions is small and a second position in which the magnetic resistance is relatively larger than in the first position. When the second tooth portion is in the first position, the following equation is satisfied: (total magnetic resistance of main magnetic circuit C1)<(total magnetic resistance of magnetic short-circuit C2)≤(total magnetic resistance of magnetic circuit between permanent magnets C3). When the second tooth portion is in the second position, it is satisfied: (total magnetic resistance of the magnetic short-circuit C2)<(total magnetic resistance of the main magnetic circuit C1), and (total magnetic resistance of the magnetic short-circuit C2)≤(total magnetic resistance of the magnetic circuit between permanent magnetics C3).

19 Claims, 19 Drawing Sheets

(56) References Cited

FOREIGN PATENT DOCUMENTS

| | | |
|---|---|---|
| JP | 11-89197 | 3/1999 |
| JP | 2006-191782 A | 7/2006 |
| JP | 2007-215289 | 8/2007 |
| JP | 2008-125203 | 5/2008 |
| JP | 2010-34522 | 2/2010 |
| JP | 2010-115001 | 5/2010 |

OTHER PUBLICATIONS

Taiwanese Office Action, issued on Sep. 18, 2014, in connection with the counterpart Taiwanese application No. 101148495, pp. 1-6 (and Taiwanese Search Report, 1 page).

Chinese Office Action (with it English-language Translation), issued on Sep. 26, 2014, in connection with the counterpart Chinese application No. 201210559852.5 (26 pages total).

* cited by examiner

ELECTRIC ROTATING MACHINE

CROSS-REFERENCE TO RELATED APPLICATIONS

This application claims priority under 35 U.S.C. §119 to Japanese Patent Application No. 2011-281393 filed on Dec. 22, 2011 and Japanese Patent Application No. 2012-227652 filed on Oct. 15, 2012, the entire disclosures of which are incorporated herein by reference in its entirety.

TECHNICAL FIELD

The present invention relates to an electric rotating machine preferably used as an electric motor as a driving source for, e.g., various electric vehicles including electric motorcycles, and various electric machines.

BACKGROUND TECHNIQUE

Conventionally, as described in Patent Document 1: Japanese Unexamined Laid-open Patent Application Publication No. 2006-191782 which is hereinafter referred to when describing the conventional art, as an electric motor used as a driving source for various electric vehicles including electric motorcycles or for various electric devices, an electric rotating machine equipped with a rotor having permanent magnets and configured to rotate about a rotation axis and a stator having stator windings and facing the rotor via a gap in a radial direction of the rotor is widely known.

In recent years, a small and high-performance electric motor as a driving source for use in various electric vehicles including electric motorcycles has been desired. In electric motors of this kind, if the operational range from a high torque low speed revolution speed range to a low torque high speed revolution speed range is wide, a driving force required for a vehicle operation can be obtained without using a transmission which is normally required for a vehicle with an internal combustion engine.

Due to characteristics of an electric motor, however, an electric motor has a problem that although a high torque can be generated in a low revolution speed range, the upper limit of the revolution speed will be limited in a high revolution speed range. That is, in an electric motor, although a high torque can be generated in a low revolution speed range, as the revolution speed increases, the induced voltage (i.e., back electromotive force), which is to be generated at the stator winding arranged on the stator by magnetic flux of the permanent magnet provided at the rotor, increases. When the revolution speed increases and reaches a certain speed, the induced voltage induced at the stator winding becomes equal to the applied voltage of the electric motor, preventing the electric current flow in the stator winding. This in turn prevents a further increase of the revolution speed. To solve this problem, it is performed, for example, to decrease the induced voltage (i.e., back electromotive force) by performing a field weakening control.

The field weakening control, however, requires an additional electrical power to negate the induced voltage. Therefore, in the case of a product having an electric motor used in a state in which an electric power is supplied from the outside, the increased power consumption does not result in a shortened drivable time. However, in the case of a product, such as, an electric motorcycle driven by a battery mounted thereon, since the battery capacity is limited, the electric current supplied to negate the induced voltage induced in the stator winding causes increased electric power consumption, resulting in a shortened drivable time. For this reason, it is requested to decrease the power consumption as much as possible.

The present inventors proposed a new stator structure capable of eliminating the need for a conventional field weakening control which induces additional power consumption. In this proposal, a tooth portion of a stator on which a winding is arranged is divided into at least two divided tooth portions in a relatively movable manner so that the relative movement thereof changes the flow of magnetic flux to decrease the flux linkage of the stator winding at the time of a high revolution speed. According to this proposal, since the flux linkage of the stator winding at the time of a high revolution speed can be adjusted by a physical means, the electrical power conventionally required for the field weakening control can be decreased or eliminated, which enabled to provide an electric rotating machine capable of decreasing power consumption.

In such an electric rotating machine having the aforementioned structure, it is desired to further enlarge the operational range from a high torque low revolution speed range to a low torque high revolution speed range.

SUMMARY OF THE INVENTION

Problems to be Solved by the Invention

The present invention was made in view of the aforementioned conventional problems, and aims to provide an electric rotating machine capable of further enlarging the operational range from a high torque low revolution speed range to a low torque high revolution speed range.

Another aspect of the present invention is to provide a radial gap type electric rotating machine capable of enlarging the operational range from a high torque low revolution speed range to a low torque high revolution speed range and also capable of reducing possible loss of Joule heat even if a strong permanent magnet is used as a permanent magnet for a rotor.

Other objects and advantages of the present invention will be apparent from the following preferred embodiments.

Means for Solving the Problems

The structure of the electric rotating machine according to the present invention will be explained below. The electric rotating machine according to the present invention is provided with a rotor having a plurality of permanent magnets embedded in a columnar rotor main body and configured to rotate about a rotation axis and a cylindrical stator arranged radially outward of the rotor so as to face an outer peripheral surface of the rotor main body via a gap.

The stator includes a plurality of tooth portions arranged at intervals in a circumferential direction of the stator, a stator yoke portion which forms a stator magnetic path together with the tooth portion, a winding arranged around the tooth portion, and a magnetic resistance changing mechanism configured to change a magnetic resistance of the stator magnetic path by mechanically changing the stator magnetic path formed by the stator yoke portion and the tooth portion. Each of the plurality of tooth portions includes a body portion and a pair of side protruded portions protruded from both sides of a rotor side end portion of the body portion in the circumferential direction.

The magnetic resistance changing mechanism is configured to mechanically change the stator magnetic path between a first state in which a magnetic resistance of the stator magnetic path is small and a second state in which the magnetic resistance of the stator is larger than the magnetic resistance of the stator magnetic path in the first state. In the first state, it is configured to satisfy a following relational expression:

total magnetic resistance of a main magnetic circuit C1<total magnetic resistance of a magnetic short-circuit C2≤total magnetic resistance of a magnetic circuit between permanent magnets C3.

In the second state, it is configured to satisfy both of following relational expressions:

total magnetic resistance of the magnetic short-circuit C2<total magnetic resistance of the main magnetic circuit C1, and total magnetic resistance of the magnetic short-circuit C2≤total magnetic resistance of a magnetic circuit between permanent magnetics C3.

The main magnetic circuit C1 is defined as a magnetic circuit having a main magnetic path which extends from one of magnetic poles of one of adjacent permanent magnets and reaches the other of magnetic poles of the one of adjacent permanent magnets via a stator yoke portion side of one of adjacent tooth portions, the other of adjacent tooth portions, and the other of adjacent permanent magnets.

The magnetic short-circuit C2 is defined as a magnetic circuit having a main magnetic path which extends from one of magnetic poles of one of adjacent permanent magnets and reaches the other of magnetic poles of the one of adjacent permanent magnets via the other of adjacent permanent magnets, without passing through a radially outward portion of the tooth portion excluding a rotor side end portion of the body portion of the tooth portion and the side protruded portions.

The magnetic circuit between permanent magnets C3 is defined as a magnetic path which extends from one of magnetic poles of one of adjacent permanent magnets and reaches the other of magnetic poles of the one of adjacent permanent magnets via an intermediate region between the adjacent permanent magnets, without passing through a radially outward portion of the tooth portion excluding the rotor side end portion of the body portion of the tooth portion and the side protruded portions.

It can be configured that the magnetic resistance changing mechanism includes a plurality of divided tooth portions divided in a radial direction of the rotation axis, wherein at least one of the divided tooth portions among the plurality of divided tooth portions constitutes a movable divided tooth portion relatively movable in the circumferential direction with respect to the other divided tooth portion, and wherein the movable divided tooth portion is movable in the circumference direction so that the magnetic resistance of the stator magnetic path changes between the first state and the second state.

It is preferable to use a rotor including a cut portion formed in an intermediate portion of the rotor main body between the adjacent permanent magnets so as to extend radially inwardly from an outer peripheral surface of the rotor main body. It is also preferable that the rotor includes a plurality of slits each for fitting a permanent magnet, the plurality of slits being formed in the outer peripheral portion of the rotor main body and arranged in the circumferential direction, and wherein the permanent magnet is inserted into the slit. It is also preferable that a connection wall for connecting an outer iron core portion constituting the outer peripheral portion of the rotor main body and positioned radially outward of the permanent magnet and an inner iron portion positioned on an opposite side of the outer iron core portion via the permanent magnet is provided between an edge portion of each permanent magnet in the circumferential direction and the cut portion.

It can be configured that each permanent magnet includes a pair of divided permanent magnets divided in the circumferential direction and arranged apart from each other, wherein the pair of divided permanent magnets are embedded in the outer peripheral portion of the rotor main body and arranged inwardly of an outer peripheral surface of the outer peripheral portion, and wherein a circumferential outer side end portion of each divided permanent magnet is exposed to the cut portion. It also can be configured such that the outer peripheral portion of the rotor main body arranged radially outward of each permanent magnet is connected to the rotor main body with a central connection wall.

According to another aspect of the present invention, an electric rotating machine includes:

a rotor having a plurality of permanent magnets embedded in a columnar rotor main body and configured to rotate about a rotation axis; and a cylindrical stator arranged radially outward of the rotor so as to face an outer peripheral surface of the rotor main body via a gap, wherein the stator includes a plurality of tooth portions arranged at intervals in a circumferential direction of the stator, wherein each of the plurality of tooth portions includes a plurality of divided tooth portions divided in a radial direction of the rotor, the plurality of divided tooth portions including at least a first tooth portion facing the outer peripheral surface of the rotor main body via the gap and a second tooth portion arranged at an outermost portion in the radial direction, wherein the stator further includes a cylindrical stator yoke portion fixing the second tooth portion and a winding arranged around the tooth portion, wherein the first tooth portion of each tooth portion include a body portion and a pair of side protruded portions protruded from circumferential both sides of a rotor side end portion of the body portion in the circumferential direction, wherein at least one of the divided tooth portions of each tooth portion among the plurality of divided tooth portions constitutes a movable divided tooth portion movable in the circumferential direction with respect to the other divided tooth portion, wherein the movable divided tooth portion is relatively movable between a first position in which a magnetic resistance of a magnetic path formed by the plurality of divided tooth portions of each tooth portion is small and a second position in which a magnetic resistance is relatively larger than the magnetic resistance of the magnetic path formed by the plurality of divided tooth portions of each tooth portion when the movable divided tooth portion is in the first position, wherein when the movable divided tooth portion is in the first position, it is configured to satisfy a following relational expression:

total magnetic resistance of a main magnetic circuit C1<total magnetic resistance of a magnetic short-circuit C2≤total magnetic resistance of a magnetic circuit between permanent magnetics C3, wherein when the movable divided tooth portion is in the second state, it is configured to satisfy both of following relational expressions:

total magnetic resistance of the magnetic short-circuit C2<total magnetic resistance of the main magnetic circuit C1, and total magnetic resistance of the magnetic short-circuit C2≤total magnetic resistance of the magnetic circuit between permanent magnetics C3, wherein the main magnetic circuit C1 is defined as a magnetic circuit having a main magnetic path which extends from one of magnetic poles of one of adjacent permanent magnets and reaches the other of magnetic poles of the one of adjacent permanent magnets via a stator yoke portion side of one of adjacent tooth portions, the other of adjacent tooth portions, and the other of adjacent permanent magnets, wherein the magnetic short-circuit C2 is defined as a magnetic circuit having a main magnetic path which extends from one of magnetic poles of one of adjacent permanent magnets and reaches the other of magnetic poles of the one of adjacent permanent magnets via the other of adjacent permanent magnets, without passing through a radially outward portion of the tooth portion excluding a rotor side end portion of the body portion of the tooth portion and the side protruded portions, and wherein the magnetic circuit between permanent magnets C3 is defined as a magnetic circuit having a magnetic path which extends from one of magnetic poles of one of adjacent permanent magnets and reaches the other of magnetic poles of the one of adjacent permanent magnets via an intermediate region between the adjacent permanent magnets, without passing through a radially outward portion of the tooth portion excluding the rotor side end portion of the body portion of the tooth portion and the side protruded portions.

It can be configured that the rotor includes a cut portion formed in an intermediate portion of the rotor main body between the adjacent permanent magnets so as to extend radially inwardly from the outer peripheral surface of the rotor main body.

It also can be configured that the rotor includes a plurality of slits each for fitting a permanent magnet, the plurality of slits being formed in an outer peripheral portion of the rotor main body and arranged in the circumferential direction, and wherein the permanent magnet is inserted into the slit.

It can be configured that a connection wall for connecting an outer iron core portion constituting the outer peripheral portion of the rotor main body and positioned radially outward of the permanent magnet and an inner iron portion positioned on an opposite side of the outer iron core portion via the permanent magnet is provided between a circumferential edge portion of the permanent magnet and the cut portion.

It can be configured that each of the plurality of permanent magnets includes a pair of divided permanents divided in the circumferential direction and arranged apart from each other, wherein the pair of divided permanent magnets are embedded in the outer peripheral portion of the rotor main body and arranged inwardly of an outer peripheral surface of the outer peripheral portion, and wherein a circumferential outer side end portion of each divided permanent magnet is exposed to the cut portion. It also can be configured such that the outer peripheral portion of the rotor main body arranged radially outward of each permanent magnet is connected to the rotor main body with a central connection wall.

Each tooth portion can be divided in the radial direction into a first tooth portion facing the outer peripheral portion of the rotor main body via a gap and a second tooth portion arranged radially outward of the first tooth portion via a gap, and the second tooth portion is relatively movable in the circumferential direction with respect to the first tooth portion.

The first position can be defined as a magnetic resistance minimum position in which a magnetic resistance of a magnetic circuit constituted by the plurality of divided tooth portions arranged in a radially aligned manner is minimum. The second position can be defined as a magnetic resistance maximum position in which a magnetic resistance of a magnetic circuit constituted by the plurality of divided tooth portions in which the movable divided tooth portion is relatively moved in the circumferential direction with respect to the other divided tooth portion is maximum. The movable divided tooth portion can be relatively movable continuously or discontinuously so that the movable divided tooth portion can take any position between the magnetic resistance minimum position and the magnetic resistance maximum position.

When the movable divided tooth portion is arranged in the first position, it is configured to satisfy the following expression:

$$(2Rh+2Rk1)<(2Rh+Rj) \leq (Rx), \text{ and}$$

wherein when the movable divided tooth portion is relatively moved with respect to the other divided tooth portion and is in the second position, it is configured to satisfy both of following expressions:

$$(2Rh+Rj)<(2Rh+2Rk2), \text{ and}$$

$$(2Rh+Rj) \leq (Rx)$$

wherein:

Rh is defined as a magnetic resistance between the outer peripheral portion of the rotor and the first tooth portion of the tooth portion;

Rk1 is defined as a magnetic resistance between the first tooth portion and the second tooth portion when the movable divided tooth portion is in the first position, Rk2 is defined as a magnetic resistance between the first tooth portion and the second tooth portion when the movable divided tooth portion is in the second position, Rj is defined as a magnetic resistance between Rj is defined as a magnetic resistance between adjacent side protruded portions of adjacent first tooth portions, and Rx is defined as a magnetic resistance of an intermediate range between the adjacent permanent magnets In any electric rotating machine, the permanent magnet can be a neodymium magnet.

According to still another aspect of the present invention, a vehicle equipped with the electric rotating machine can be provided.

According to still yet another aspect of the present invention, an electronic apparatus comprising the electric rotating machine can be provided.

Effects of the Invention

According to some preferred embodiments of the present invention, an electric rotating machine capable of enlarging the operation range by extending the upper limit of the revolution speed in a high revolution speed range can be provided. Also, an electric rotating machine capable of decreasing or eliminating the electric power for a conventional field weakening control can be provided. Furthermore, even in the case of using a strong permanent magnet, high torque can be obtained in a low revolution speed range, and the upper limit of the revolution speed in the high revolution speed range and the operational range can be enlarged. In addition, it becomes possible to provide an electric rotating machine that can control the decrease in efficiency by decreasing the occurrence of a loss of Joule heat generated in the permanent magnet, the decrease in the magnetic coercive force and residual magnetic flux density of the permanent magnet caused by the heat generation due to the loss of Joule heat, and the decrease in efficiency of the electric motor.

EMBODIMENTS FOR CARRYING OUT THE INVENTION

Figure 10:
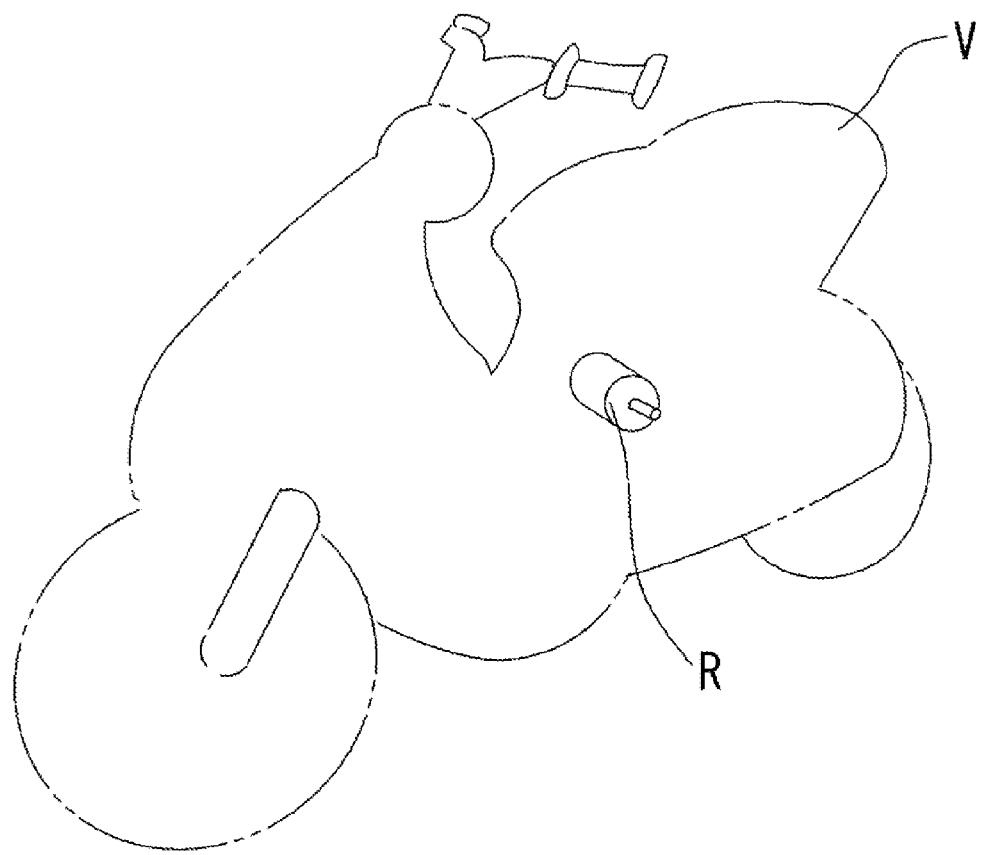
FIG. 10 is a view schematically showing a vehicle equipped with the electric rotating machine according to the present invention.
Figure 11:
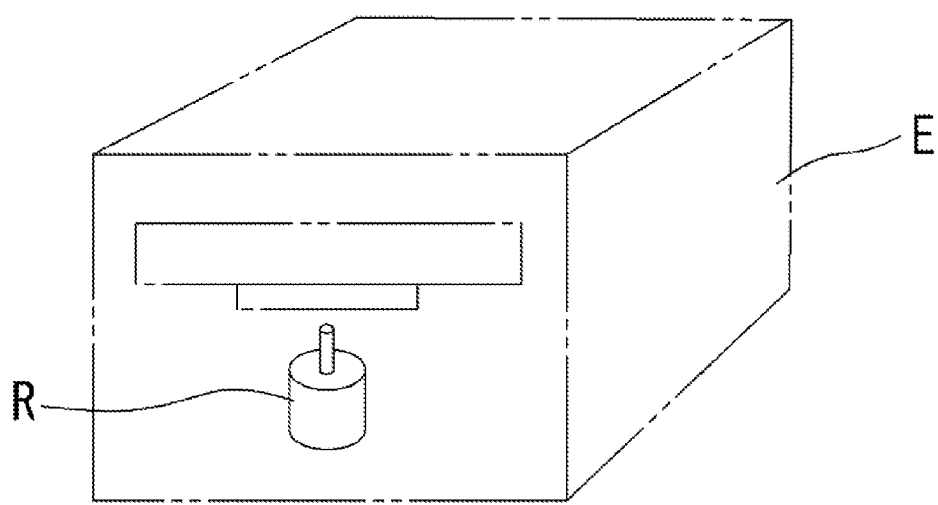
FIG. 11 is a view schematically showing an electric product equipped with the electric rotating machine according to the present invention.

Preferred embodiments of the present invention will be explained with reference to the attached drawings. The electric motor as an electric rotating machine R according to the embodiments of the present invention is suitably used for a main driving source or an auxiliary driving source in a variety of vehicles V including, e.g., electric motorcycles and other vehicles requiring high torque at a low revolution speed and low torque at a high revolution speed (see FIG. 10). The electric rotating machine according to the present invention is not limited for use in these vehicles, but can be used for, for example, an electric motor as a driving force in electric products E including household electronics, such as, e.g., a washing machine, or an office automation device, such as, e.g., a DVD player (see FIG. 11).

Figure 9A:
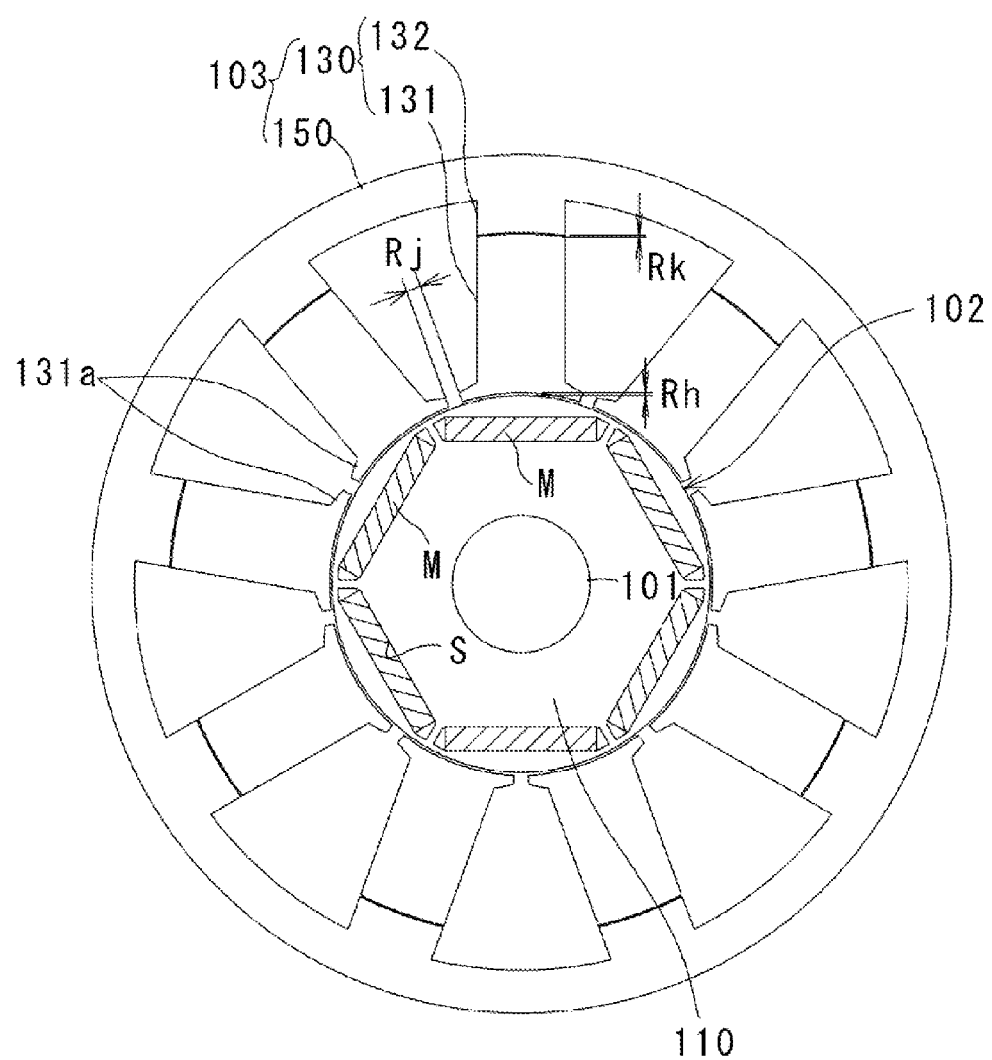
FIG. 9A is a cross-sectional view schematically showing an electric rotating machine proposed by the present inventors, showing a state in which the second tooth portion is in a first position in which a first tooth portion and the second tooth portion are in a radially aligned manner.
Figure 9B:
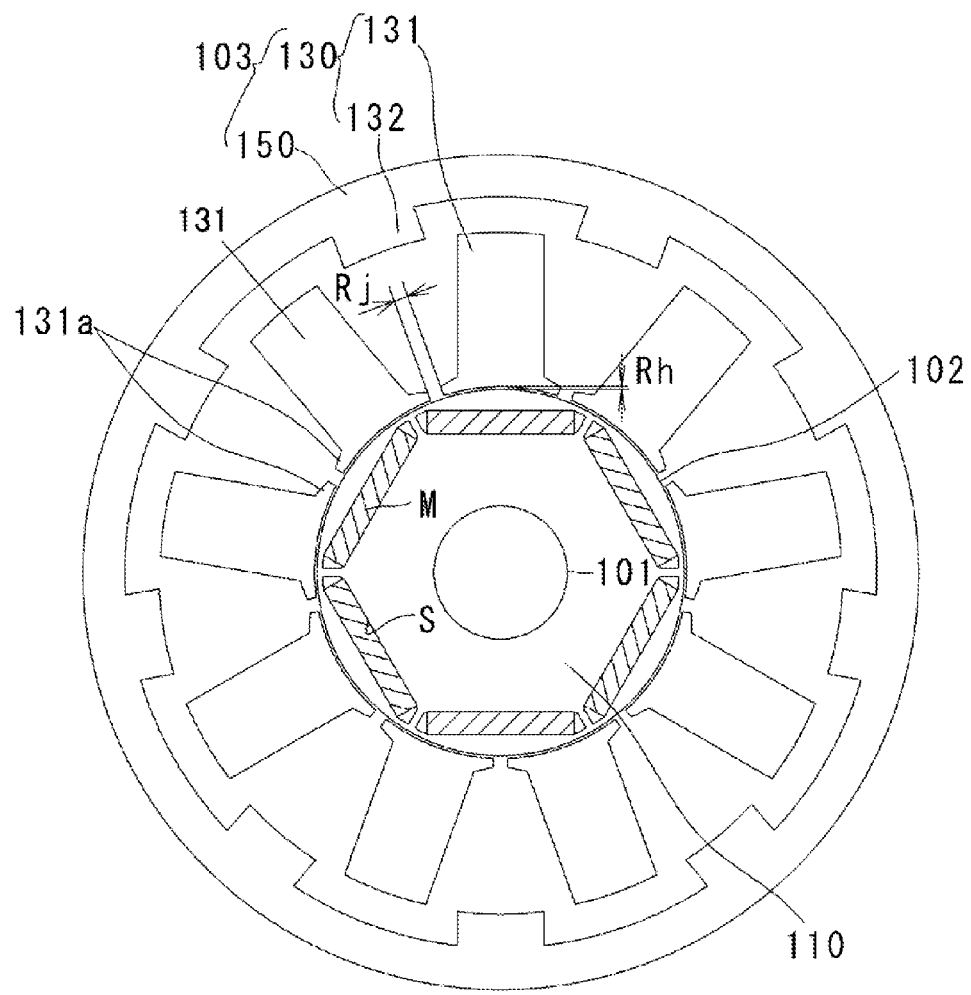
FIG. 9B is a cross-sectional view of the electric rotating machine shown in FIG. 9A schematically showing a state in which the second tooth portion is moved with respect to the first tooth portion to be located in the second position.

Initially, the development process of the present invention will be explained. In the market, an even higher-performance electric rotating machine was desired. Therefore, the present inventors attempted to further improve the performance by employing a permanent magnet having a stronger magnetic force, such as, e.g., a neodymium magnet. In detail, in a radial gap type electric rotating machine, the present inventors initially conducted a variety of researches and studies to use a stronger permanent magnet. Specifically, as shown in FIGS. 9A and 9B, the present inventors proposed a radial gap type electric rotating machine provided with a rotor 102 in which a plurality of permanent magnets M are embedded in an outer peripheral portion of a cylindrical rotor main body 110 configured to rotate about a rotation axis 101 and arranged at constant intervals in a circumferential direction of the rotor main body 110 and a cylindrical stator 103 arranged radially outward of the rotor 102 so as to face an outer peripheral surface of the rotor main body 110 via a gap. More specifically, the electric rotating machine has the following structure.

As a permanent magnet M, a magnet formed into a disk shape of a rectangular cross-section and extending in an axial direction is used. The permanent magnet M is embedded in and fixed to the outer peripheral portion of the rotor main body 110 in a state in which the magnet M is fitted in the slit S having a corresponding cross-sectional shape and formed radially inward of the outer peripheral surface of the rotor main body 110 so as to be positioned by a predetermined distance. Therefore, even if the rotor main body 110 rotates at a high revolution speed about the rotation axis 101, the permanent magnet M does not break loose to the outside in the radial direction due to the centrifugal force since the permanent magnet M is fixedly fitted in the slit S.

The stator 103 is arranged radially outward of the rotor 102 and coaxially with the rotor 102 so as to face the outer peripheral surface of the rotor 102 via a predetermined gap. The stator 103 is configured such that a plurality of tooth portions 130 are arranged at constant intervals in the circumferential direction of the rotor 102 in a state in which the stator 103 is arranged radially outward of the outer peripheral surface of the rotor 102 via the gap. Each tooth portion 130 is divided into two divided tooth portions in a radial direction at a position of the tooth portion 130 closer to an outer end portion of the tooth portion 130 opposite to a rotor side end portion of the tooth portion 130, i.e., a first tooth portion 131 arranged closer to the rotor side and a second tooth portion 132 arranged outward of the first tooth portion 131. The first tooth portion 131 and the second tooth portion 132 are arranged in a relatively movable manner in the circumferential direction with a predetermined gap formed therebetween.

In each first tooth portion 131, a radially inward end edge of the rotor side end portion is formed into an arc shape corresponding to the outer peripheral shape of the rotor 102, and that side protruded portions 131a and 131a extending along the circumferential direction are integrally formed on both circumferential side portions of the rotor side end portion. In each first tooth portion 131, a winding (not illustrated) is provided.

Further, the second tooth portion 132 as a movable divided tooth portion is configured such that the relative position of the second tooth portion 132 can be continuously changed relative to the first tooth portion 131 between a position in which the first tooth portion 131 and the second tooth portion 132 are in a radially aligned manner as shown in FIG. 9A and a position in which the second tooth portion 132 is located at an intermediate position between the pair of adjacent first tooth portions 131 and 131 as shown in FIG. 9B.

Using the electric motor having the aforementioned structure, a simulation analysis was performed by moving the second tooth portion 132 as the movable divided tooth portion in the circumferential direction to change its relative position relative to the first tooth portion 131. As a result, it was confirmed that, by moving the second tooth portion 132 as a movable divided tooth portion in the circumferential direction to change its relative position relative to the first tooth portion 131, the upper limit of the high revolution speed range can be increased, which in turn can enlarge the operational range without requiring an electric power for a conventional field weakening control.

On the other hand, however, the present inventors found the following problems through their further experiments and researches. That is, when the electric motor is operated in a state in which the second tooth portion 132 is moved to the second position by moving the second tooth portion 132 as the movable divided tooth portion in the circumferential direction to change its relative position relative to the first tooth portion 131, although the upper limit of the high revolution speed range can be extended and the operational range can be enlarged, the efficiency of the electric motor is deteriorated.

To solve the problem, the present inventors further conducted their researches, experiments, and analyses, and could find the following facts. That is, when the electric motor is operated in a state in which the second tooth portion 132 is in the second position, a large change in magnetic flux occurs in the permanent magnet M, generating eddy currents in the permanent magnet M to cause a loss by Joule heat, which in turn decreases the efficiency of the motor. Furthermore, the present inventors further found the fact that the loss by Joule heat increases the temperature of the permanent magnet M, resulting in deteriorated coercive force and residual magnetic flux density of the permanent magnet M and deteriorated efficiency of the electric motor.

The present inventors have found the fact that the aforementioned problems can be solved by appropriately setting the relationships of the "total magnetic resistance of the main magnetic circuit", the "total magnetic resistance of the magnetic short-circuit", and the "total magnetic resistance of the magnetic circuit between permanent magnets" depending on the position of the movable divided tooth portion 132 with respect to the first divided tooth portion 131 while enlarging the operational range by extending the upper limit of the high revolution speed range, and completed the present invention. Hereinafter, the present invention will be explained in detail based on specific embodiments.

First Embodiment

FIGS. 1 to 6 schematically show a radial gap type electric motor used as an electric motor for electric motorcycles according to a first embodiment of the present invention.

Figure 2:
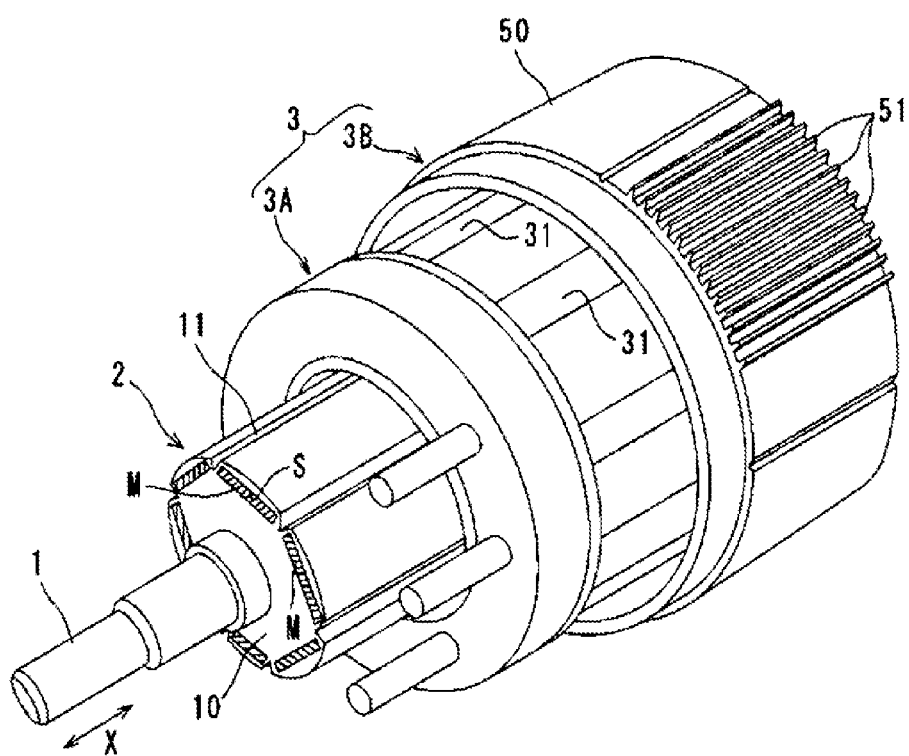
FIG. 2 is a perspective view showing main structural members of the electric rotating machine in a sequentially pulled out manner in the axial direction.

As shown in these figures, the radial gap type motor includes a columnar rotor 2 having a plurality of permanent magnets M arranged at an outer peripheral portion at certain intervals in a circumferential direction in an embedded manner and configured to rotate about a rotation axis 1, a cylindrical stator 3 facing an outer peripheral portion of the rotor 2 in the radial direction via a gap, and a rotating mechanism 4 configured to relatively move a movable divided tooth portion constituting the stator 3, which will be explained later. As shown in FIG. 2, the rotor 2 includes a cylindrical rotor main body 10 having the rotation axis 1 at the axial center thereof. A plurality (six in this embodiment) of plate shaped permanent magnets M each having a rectangular cross-sectional shape are arranged in the circumferential direction of the rotor 2 in an embedded manner at constant intervals in the outer peripheral portion of the rotor main body 10.

As the permanent magnet M, a magnet, such as, e.g., a neodymium magnet, which creates a strong magnetic field, can be used. The present inventors found that, especially when a strong permanent magnet is used, depending on the shape and/or arrangement of the permanent magnet, the rotor, and the stator, a loss by Joule heat occurs in the permanent magnet, increasing the temperature of the permanent magnet, which largely deteriorates the efficiency of the motor and decreases the coercive force of the permanent magnet and residual magnetic flux density of the permanent magnet to deteriorate the motor's characteristics. These problems are not limited in the case of using a strong permanent magnet, and can occur in varying degrees in the case of using a conventional permanent magnet having a normal magnetic force. In the rotating electric motor according to the present invention, the aforementioned problems are solved by the newly proposed structure which will be mentioned later.

Figure 3:
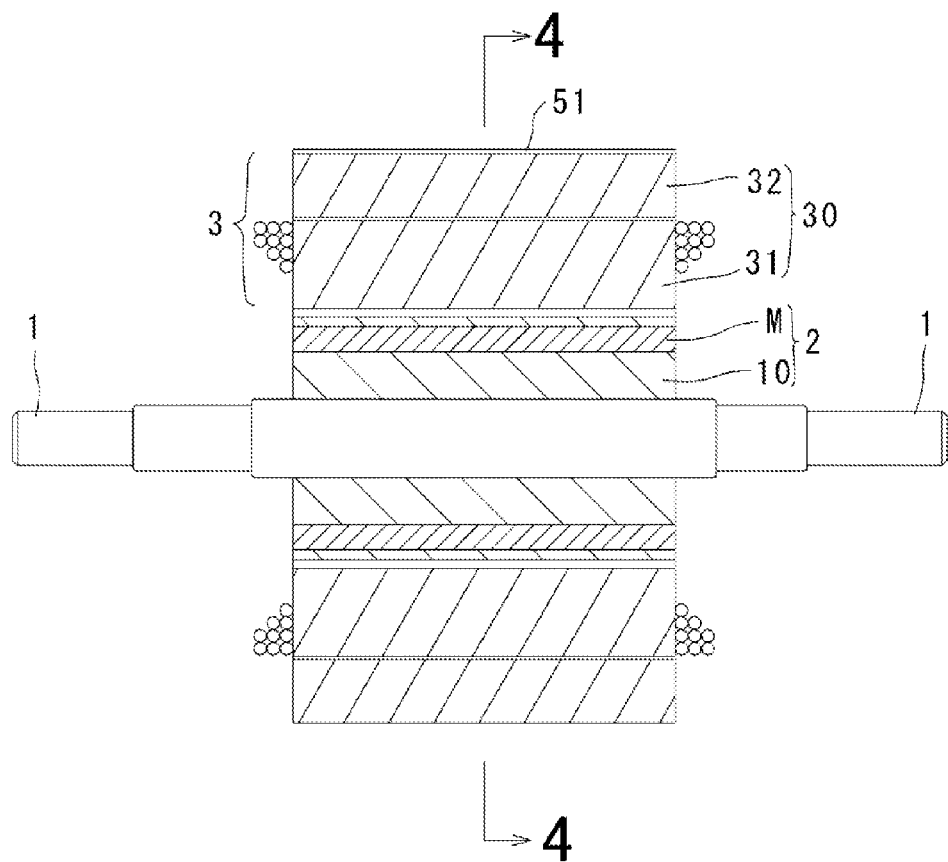
FIG. 3 is a cross-sectional view showing the rotor and the stator of the electric rotating machine.

As shown in FIG. 2, the permanent magnet M is formed into a plate shape having a rectangular cross-sectional shape extending along the axial direction X. As shown in FIG. 3, the permanent magnet M is embedded in and fixed to a slit S having a corresponding cross-sectional shape and formed in the outer peripheral portion of the rotor main body 10 at a position radially inward of the outer peripheral surface by a predetermined distance. Therefore, even if the rotor main body 10 rotates at a high revolution speed about the rotation axis 1, the permanent magnet M does not break loose to the outside in the radial direction due to the centrifugal force since the permanent magnet M is fixedly fitted in the slit S.

Figure 5A:
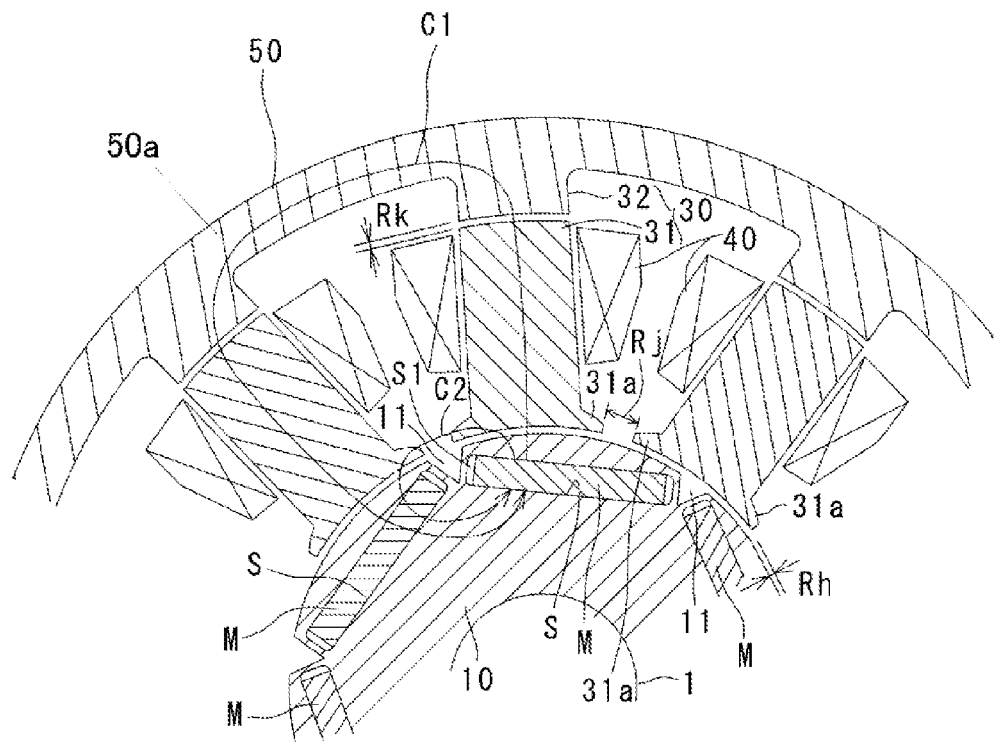
FIG. 5A is a partially enlarged cross-sectional view in the first positional state shown in FIG. 4A.

The width dimension of the slit S is, for example, as shown in FIG. 5A, formed to be slightly larger than the width dimension of the permanent magnet M. In a state in which the permanent magnet M is fitted in the slit S, an air gap S1 is formed at both ends of the permanent magnet M and constitutes a flux barrier. On the outer peripheral edge of the rotor main body 10, a cut portion 11 having a V-shaped cross-sectional shape is formed radially inwardly on the outer peripheral surface so as to extend in the axial direction X. On both sides of the cut portion 11, a connection wall 9 connecting an upper iron core portion and a lower iron core portion arranged on the outer side and the inner side of the permanent magnet M respectively is integrally formed (shown in FIG. 6A, for example).

The rotor main body 10 is formed by, for example, bonding a plurality of thin silicon steel plates, each formed into a predetermined shape by punching process, in the axial direction X, so that possible eddy-current loss to be generated due to changes in magnetic flux in the rotor main body 10 can be reduced.

The stator 3 is arranged coaxially with the rotor 2 via a predetermined gap and arranged radially outward of the rotor 2 so as to face the rotor 2. As shown in FIG. 2, the stator 3 includes a cylindrical first stator portion 3A coaxially arranged with the rotor 2 via a predetermined gap and arranged outward of the outer peripheral surface of the rotor 2, and a cylindrical second stator portion 3B coaxially arranged with the rotor 2 radially outward of the first stator portion 3A via a predetermined gap in a state in which the second stator portion 3B is movable in the circumferential direction relative to the first stator portion 3A.

Figure 4A:
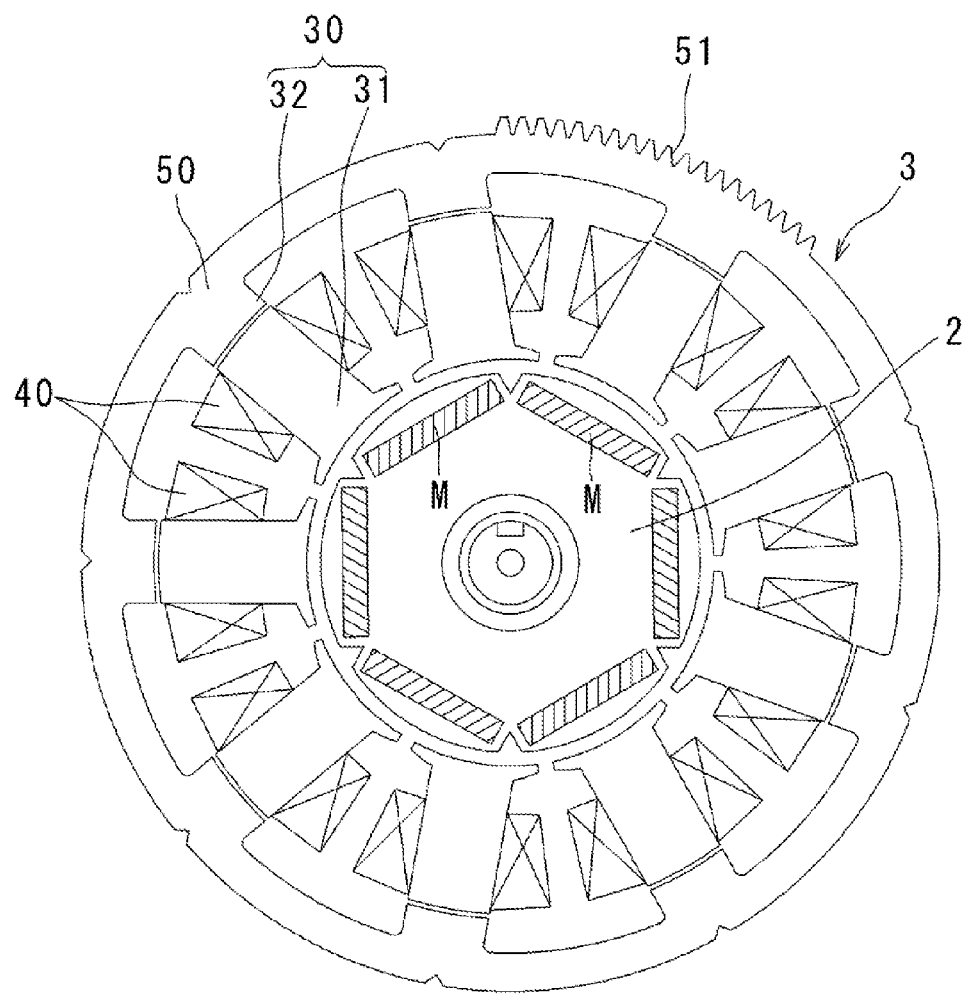
FIG. 4A is a cross-sectional view taken along the line 4-4 in FIG. 3 and showing a state in which the second tooth portion is in the first position in which the first tooth portion and the second tooth portion are arranged in a radially aligned manner.

The stator 3 includes, as shown in FIG. 4A, a plurality of tooth portions 30 arranged at predetermined intervals along the circumferential direction of the rotor 2 are arranged radially outward of the rotor 2 with the gap formed therebetween. Each tooth portion 30 is divided, at a portion closer to an end portion opposite to a rotor side end portion, into two divided tooth portions in the radial direction, i.e., a first tooth portion 31 arranged closer to the rotor side and a second tooth portion 32 arranged outward of the first tooth portion 31.

The first tooth portion 31 and the second tooth portion 32 are arranged via a predetermined gap so that both the tooth portions can be relatively moved. The gap between the first tooth portion 31 and the second tooth portion 32 is set to be smaller than the gap between the rotor side end edge of the first tooth portion 31 and the outer peripheral surface of the rotor 2. That is, in a state in which the first tooth portion 31 and the second tooth portion 32 are arranged in the radially aligned manner, the magnetic resistance Rk between the first tooth portion 31 and the second tooth portion 32 is smaller than the magnetic resistant Rh between the rotor side end edge of the first tooth portion 31 and the outer peripheral edge of the rotor 2 (see FIG. 5A).

Each first tooth portion 31 is formed so that the end edge of the rotor side end portion is formed into a circular arc shape corresponding to the outer circumferential shape of the rotor 2, and is integrally provided with side protruded portions 31a and 31a extending in the circumferential direction from both circumferential side portions of the rotor side end portion (see FIG. 5A).

The gap between the side protruded portions 31a and 31a of adjacent first tooth portions 31 and 31 is set to be larger than the gap between the first tooth portion 31 and the second tooth portion 32. Specifically, the gap between the adjacent side protruded portions 31a and 31a of the adjacent tooth portions 30 and 30 is set so that the magnetic resistance Rj between the adjacent side protruded portions 31a and 31a of the adjacent first tooth portions 31 and 31 is larger than 2 times the magnetic resistance between the first tooth portion 31 and the second tooth portion 32 (i.e., 2Rk (2Rk1)) in a state in which the first tooth portion 31 and the second tooth portion 32 are arranged in the radially aligned manner (see FIG. 5A).

Each first tooth portion 31 is provided with a winding 40. As shown in FIG. 2, a plurality of first tooth portions 31 with these windings 40 constitute the cylindrical first stator portion 3A molded with resin. The winding 40 can be a single winding or a plurality of separate and independent windings. In this embodiment, a single winding is employed.

The second tooth portion 32 is, as shown in FIG. 5A, formed integral with the stator yoke portion 50 in a manner such that the second tooth portion 32 is inwardly protruded from the inner peripheral surface of the cylindrical stator yoke portion 50, and arranged corresponding to the first tooth portion 31. In this embodiment, the second tooth portion 32 is an integral structure with the stator yoke portion 50, but it can be configured such that the second tooth portion 32 is formed separately from the stator yoke portion 50 and connected and fixed to the stator yoke portion 50. As shown in FIG. 2, the second tooth portion 32 and the stator yoke portion 50 constitute the cylindrical second stator portion 3B.

Figure 1:
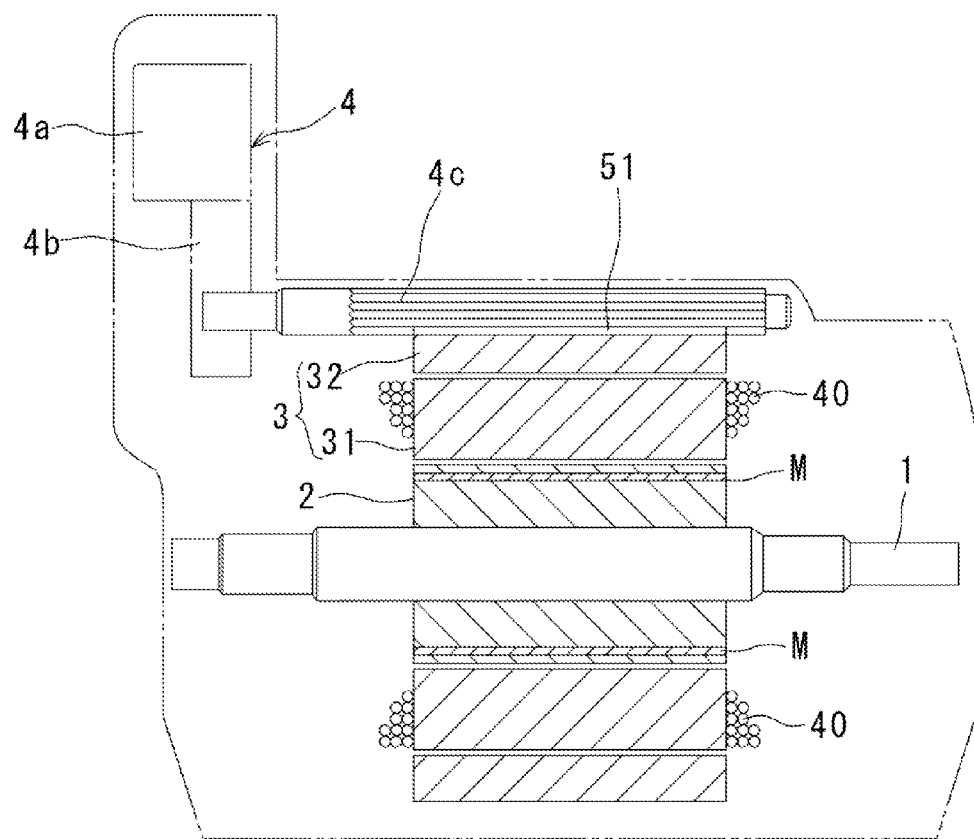
FIG. 1 is a cross-sectional view schematically showing a structure of an electric rotating machine according to a first embodiment of the present invention.

On the outer peripheral surface of the stator yoke portion 50 constituting the second stator portion 3B, as shown in FIG. 2, on a part of the circumferential region, a gear portion 51 having a plurality of teeth is formed along the entire length in the longitudinal direction of the stator yoke portion 50. As shown in FIG. 1, the gear portion 51 is engaged with a wheel gear 4c which is rotary driven by a drive motor 4a of the rotating mechanism 4 via the speed reduction mechanism 4b.

The drive motor 4a is structured to rotate in both opposite directions by a controller not shown in the drawing, and the rotational force of the drive motor 4a is transmitted to the wheel gear 4c via the speed reduction mechanism 4b. The rotation of the wheel gear 4c is transmitted to the gear portion 51 of the stator yoke portion 50 (second stator portion 3B), and the second stator portion 3B is relatively moved in the circumferential direction with respect to the first stator portion 3A. Thus, the second tooth portion 32 can be freely and relatively moved in a certain range in the circumferential direction of the first tooth portion 31. In this way, by controlling the drive motor 4a, the relative positions of the first tooth portion 31 and the second tooth portion 32 can be arbitrarily and continuously or discontinuously changed.

Figure 4B:
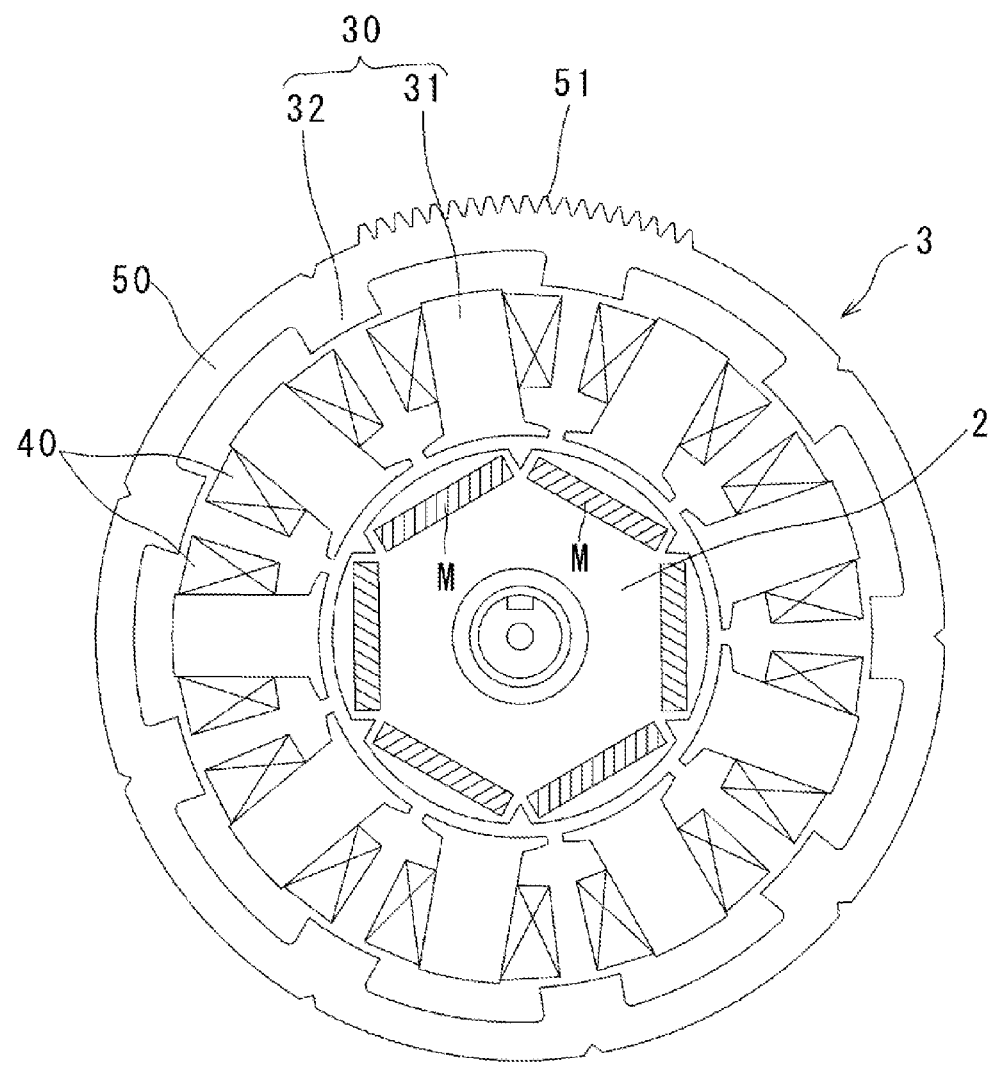
FIG. 4B is a cross-sectional view corresponding to FIG. 4A, showing a state in which the second tooth portion is in the second position in which the second tooth portion is relatively moved with respect to the first tooth portion.

By controlling the drive motor 4a, the relative position of the second tooth portion 32 as a movable divided tooth portion with respect to the first tooth portion 31 can be freely changed continuously or discontinuously between a magnetic resistance minimum position in which, as shown in FIG. 4A, the magnetic resistance of the magnetic path formed by the first tooth portion 31 and the second tooth portion 32 arranged in a radially aligned manner is minimum and a magnetic resistance maximum position in which, as shown in FIG. 4B, the second tooth portion 32 is positioned in between a pair of adjacent first tooth portions 31 and 31 and the magnetic resistance of the magnetic path formed by the first tooth portion 31 and the second tooth portion 32 is maximum.

When the magnetic resistance minimum position as shown in FIG. 4A is defined as a first position and the magnetic resistance maximum position as shown in FIG. 4B is defined as a second position, the movable divided tooth portion (the second tooth portion 32) is controlled so that the movable divided tooth portion moves between the first position and the second position.

In the present invention, it is not required that the first position and the second position exactly correspond to the magnetic resistance minimum position and the magnetic resistance minimum position, respectively. For example, in the present invention, it can be configured such that two arbitrary positions between the magnetic resistance minimum position and the magnetic resistance maximum position are defined as the first position and the second position, respectively, and that the movable divided tooth portion (second tooth portion) 32 is moved between the first position and the second position. Furthermore, in the present invention, when a state in which the magnetic resistance of the stator magnetic path formed by the stator yoke portion 50 and the tooth portion 30 is small is defined as a first state, and a state in which the magnetic resistance of the stator magnetic path is relatively larger than the first state is defined as a second state, the present invention includes a case in which the stator magnetic path is mechanically changed so that the magnetic resistance of the stator magnetic path is changed between the first state and the second state. The following explanation is made using the aforementioned languages, i.e., the first position and the second position, but it should be understood that the same effects can be attained when these languages are replaced with the first state and the second state.

In this embodiment, a tooth portion 30 which is divided into two portions in the radial direction is exemplified, but the tooth portion is not limited to that. In the present invention, the tooth portion 30 can be divided into, for example, three or more portions in the radial direction. When the tooth portion 30 is divided into three or more portions, the divided tooth portion arranged closest to the rotor 2 is defined as the first tooth portion 31, and the divided tooth portion arranged at the radially outermost side is defined as the second tooth portion 32. In cases where the tooth portion is divided into three or more divided tooth portions, it can be configured such that at least one of the plurality of divided tooth portions constitutes a movable divided tooth portion relatively movable with respect to the other divided tooth portions, and the magnetic resistance of the magnetic path formed by the divided tooth portions is adjustable by the relative movement of the movable divided tooth portion.

In this embodiment, the following explanation is made such that each tooth portion is divided into a first tooth portion 31 and a second tooth portion 32, but the structure can be understood as follows. That is, it can be understood such that the first tooth portion 31 constitutes a tooth portion; the second tooth portion 32 and the stator yoke portion 50 constitute a stator yoke portion; a concave portion 50a (see FIG. 5A) is formed on the inner peripheral surface of the stator yoke portion 50; and the stator yoke portion is relatively movable with respect to the tooth portion (first tooth portion 31) in the circumferential direction. When it is understood that the tooth portion 30 has a structure in which the tooth portion 30 is not divided in the radial direction, it can be understood such that the stator 3 is provided with a magnetic resistance changing mechanism in which the magnetic resistance value of the stator magnetic path changes when the stator magnetic path formed by the stator yoke portion 50 and the tooth portion 30 is mechanically changed. The aforementioned magnetic resistance changing mechanism is not limited to a type as shown in the embodiment in which tooth portions are divided, but can have any other structure as long as the stator magnetic path formed by a stator yoke portion 50 and a tooth portion 30 is mechanically changed so that the magnetic resistance value of the stator magnetic path can be changed. For example, one example of a modified magnetic resistance changing mechanism includes a mechanism in which without dividing each tooth portion, the stator yoke portion 50 is divided in the circumferential direction to form a magnetic gap at a part of the stator yoke portion 50 so that the magnetic gap can be adjusted.

In a state in which the second tooth portion 32 as a movable divided tooth portion is arranged in the first position, it is configured to satisfy the following relational expressions:

(the total magnetic resistance of the main magnetic circuit C1) (i.e., $2Rh+2Rk$ ($2Rk1$))<(the total magnetic resistance of the magnetic short-circuit C2 ($2Rh+Rj$)) (total magnetic resistance of the magnetic circuit between permanent magnets C3 ($Rx$)).

Also, in a state in which the second tooth portion 32 as a movable divided tooth portion is arranged in the second position, it is configured to satisfy both the following relational expressions:

Rational expression A: (the total magnetic resistance of the magnetic short-circuit C2) (i.e., $2Rh+Rj$)<(the total magnetic resistance of the main magnetic circuit C1) (i.e., $2Rh+2Rk$ ($2Rk2$));

Rational expression B: (the total magnetic resistance of the magnetic short-circuit C2) (i.e., $2Rh+Rj$)≤(the total magnetic resistance of the magnetic circuit between permanent magnets C3 (i.e., $Rx$)).

The main magnetic circuit C1, the magnetic short-circuit C2, and the magnetic circuit between the permanent magnets C3 are defined as follows.

Figure 5B:
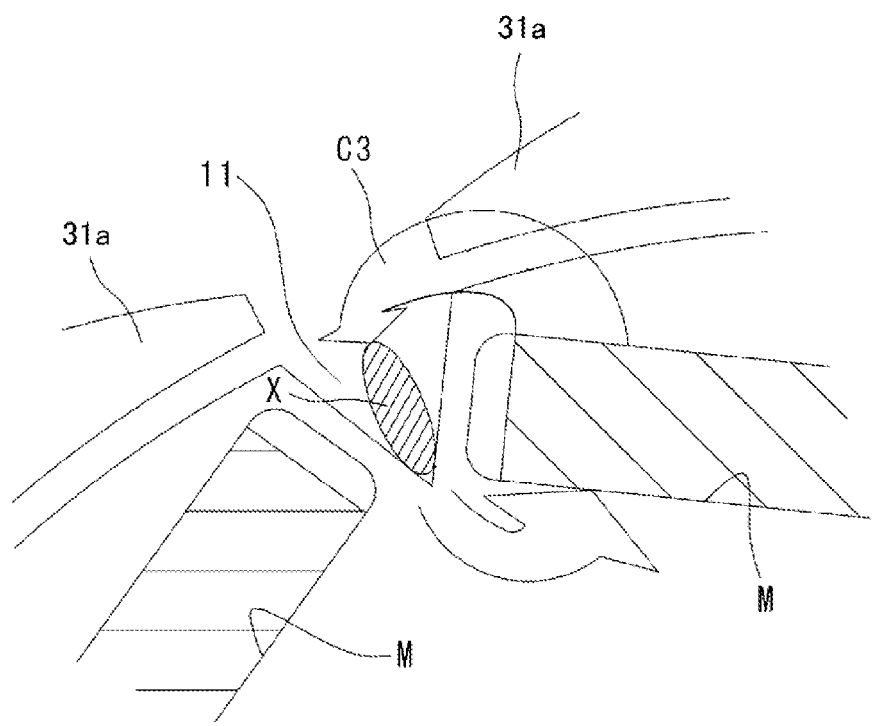
FIG. 5B is an enlarged cross-sectional view showing adjacent permanent magnets and the vicinity thereof shown in FIG. 5A.
Figure 5C:
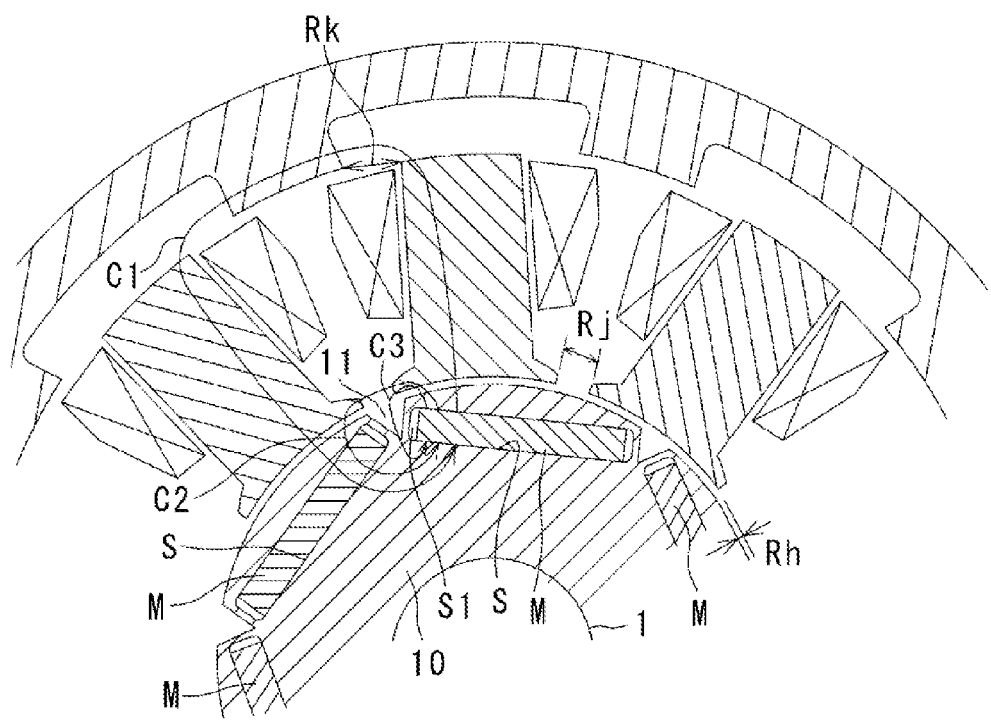
FIG. 5C is a partially enlarged cross-sectional view in a second positional state shown in FIG. 4B.

As shown in FIGS. 5A and 5C, the main magnetic circuit C1 is defined as a magnetic circuit having a main magnetic path which extends from one of magnetic poles of one of adjacent permanent magnets M and M and reaches the other of magnetic poles of the one of adjacent permanent magnets via one of adjacent tooth portions 30 and 30, the other of adjacent tooth portions 30 and 30, and the other of adjacent permanent magnets M and M by way of stator yoke portion sides of the adjacent tooth portions 30 and 30.

More specifically, when the movable divided tooth portion 32 is in the first position in which the movable divided tooth portion 32 and the first tooth portion 31 are arranged in a radially aligned manner as shown in FIG. 5A, the main magnetic circuit C1 is defined as a magnetic circuit having a main magnetic path which extends from one of magnetic poles of one of adjacent permanent magnets M and M and reaches the other of magnetic poles of the one of adjacent permanent magnets M and M via the first tooth portion 31 of one of adjacent tooth portions 30 and 30, the second tooth portion 32 of the one of adjacent tooth portions 30 and 30, the stator yoke portion 50, the second tooth portion 32 of the other of adjacent tooth portions 30 and 30, the first tooth portion 31 of the other of adjacent tooth portions 30 and 30, and the other of adjacent magnetics M and M.

On the other hand, when the movable divided tooth portion 32 is moved counterclockwise and is in the second position between the adjacent first tooth portions 31 and 31 as shown in FIG. 5C, the main magnetic circuit C1 is defined as a magnetic circuit having a main magnetic path which extends from one of magnetic poles of adjacent permanent magnets M and M and reaches the other of magnetic poles of the adjacent permanent magnets M and M via the first tooth portion 31 of one of adjacent tooth portions 30 and 30, a stator yoke portion side end portion of the first tooth portion 31, an end portion of the second tooth portion 32 corresponding to the stator yoke portion side end portion of the first tooth portion 31, the second tooth portion 32 of the one of adjacent tooth portions 30 and 30, an opposite end portion on the second tooth portion 32, a stator yoke portion side end portion of the first tooth portion 31 of the other of adjacent tooth portions 30 and 30, the first tooth portion 31 of the other of adjacent tooth portions 30 and 30, and the other of the adjacent permanent magnets M and M. In this state, when the second tooth portion 32 is in the second position, on the stator yoke portion 50 side, the main magnetic flux mainly passes through the second tooth portion 32 and only a limited main magnetic flux passes through the stator yoke portion 50.

Needless to say, regardless of the position of the second tooth portion 32, the magnetic flux of the permanent magnet M passes other than the aforementioned path, e.g., between adjacent first tooth portions 31 and 31, as a leakage flux. In the present invention, the magnetic circuit is defined based on a main magnetic flux path. It should be understood that this interpretation is applied not only to the main magnetic circuit C1 but also to the magnetic short-circuit C2 and the magnetic circuit between the permanent magnets C3.

As shown in FIGS. 5A and 5C, the magnetic short-circuit C2 is defined as a magnetic circuit having a main magnetic path which extends from one of magnetic poles of one of adjacent permanent magnets M and M and reaches the other of magnetic poles of the one of the adjacent permanent magnets M and M via the other of adjacent permanent magnets M and M, without passing through a radially outward portion of the tooth portion excluding a rotor side end portion of a body portion of the first tooth portion 31 and the side protruded portions 31a and 31a of the first tooth portion 31.

Figure 6A:
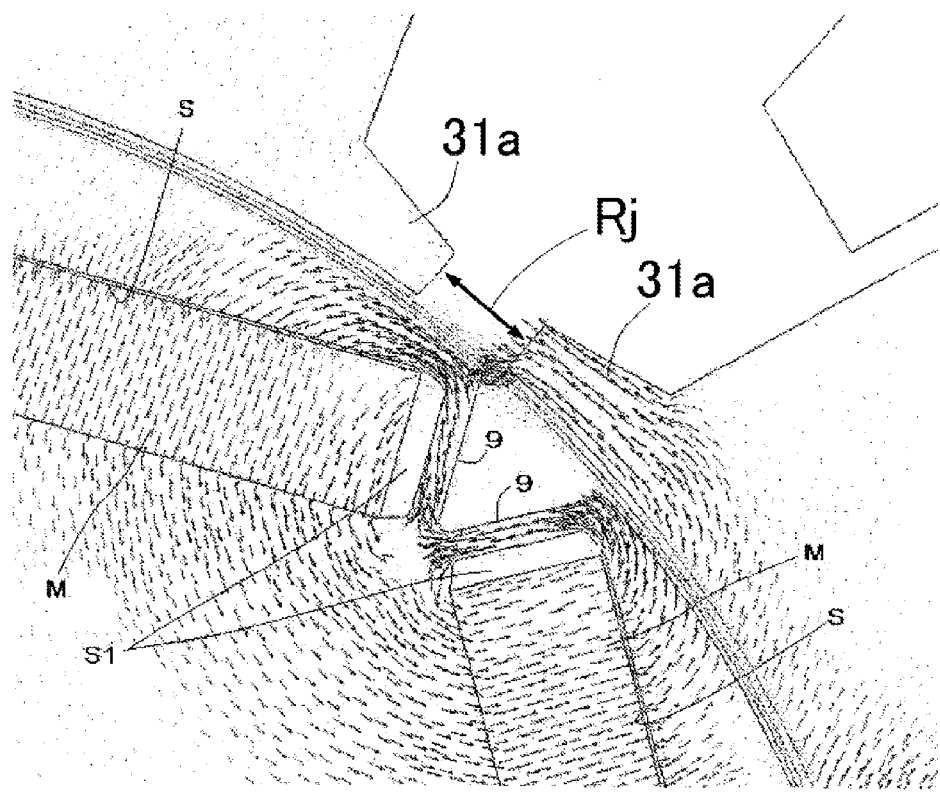
FIG. 6A is an explanatory view showing a magnetic flux flow when the rotor rotates in the second position shown in FIG. 4B.
Figure 6B:
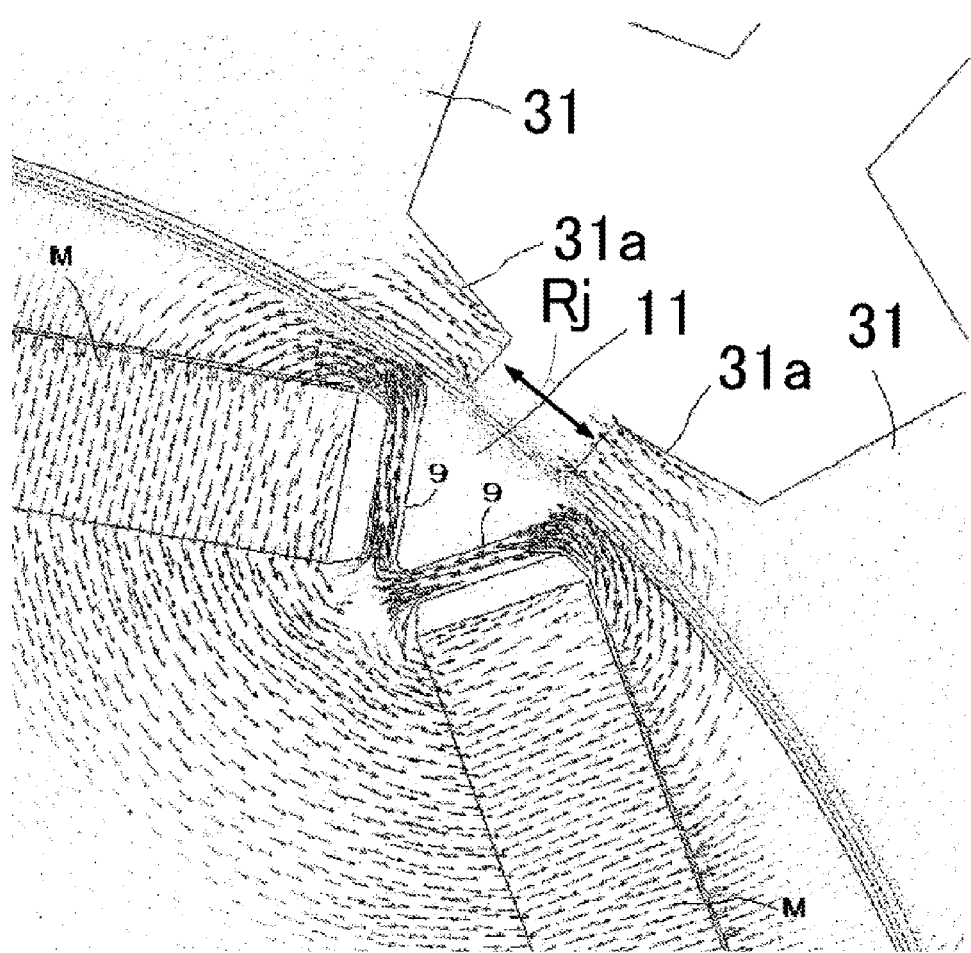
FIG. 6B is an explanatory view showing a magnetic flux flow in a state in which the rotor rotates counterclockwise from the state shown in FIG. 6A.

More specifically, as shown in FIG. 6B, when adjacent end portions of the adjacent permanent magnets M and M are in the position corresponding to the adjacent side protruded portions 31a and 31a of the adjacent first tooth portions 31 and 31, the magnetic short-circuit C2 is defined as a magnetic circuit having a magnetic main path as follows. That is, the magnetic short-circuit C2 is defined as a magnetic circuit C2 having a main magnetic path which extends from one of magnetic poles of one of adjacent permanent magnets M and M and reaches the other of magnet poles of the one of adjacent permanent magnets M and M via a rotor side end portion of the first tooth portion 31 of the one of adjacent tooth portions 30 and 30, one of side protruded portions 31a of the rotor side end portion of the first tooth portion 31 of the one of adjacent tooth portions 30 and 30, a side protruded portion 31a of the rotor side end portion of the first tooth portion 31 of the other of adjacent tooth portions 30 and 30, which is adjacent to the one of side protruded portions 31a, a rotor side end portion of the first tooth portion 31 of the other of adjacent tooth portions 30 and 30, and the other of adjacent permanent magnetics M and M.

Figure 6C:
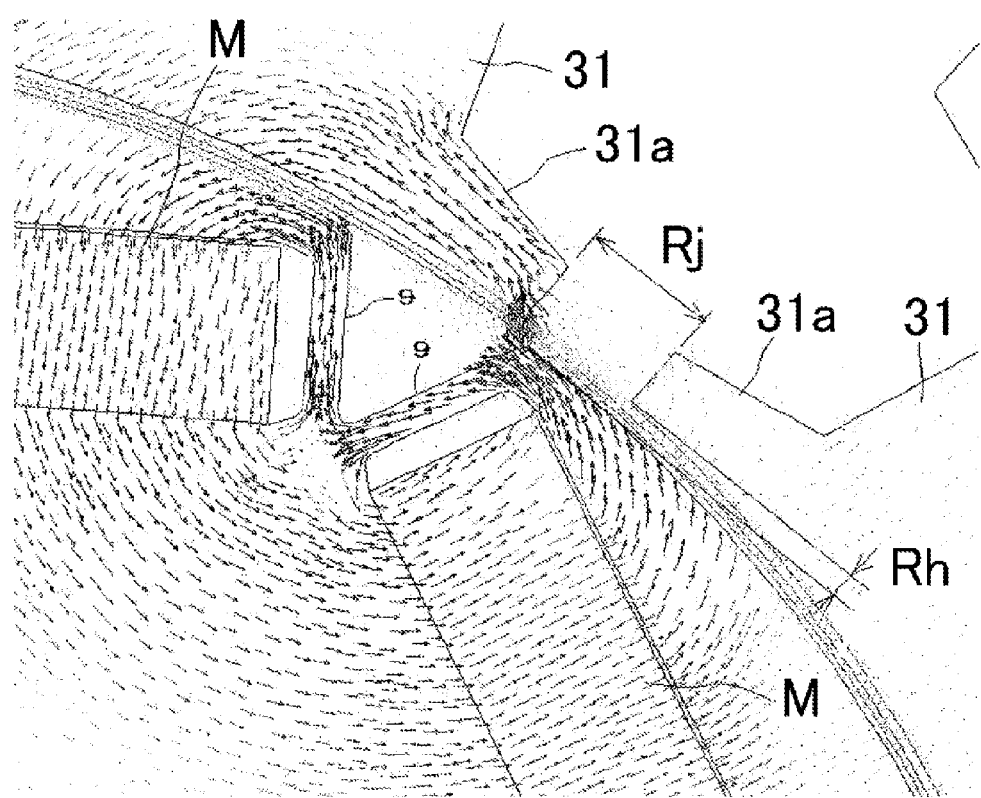
FIG. 6C is an explanatory view showing a magnetic flux flow in a state in which the rotor further rotates counterclockwise from the state shown in FIG. 6B.

Also, as shown in FIGS. 6A and 6C, when the adjacent end portions of the adjacent permanent magnets M and M are in a position corresponding to one of side protruded portions 31a and 31a of the first tooth portion 31 of the tooth portion 30, the magnetic short-circuit C2 is defined as follows. That is, the magnetic short-circuit C2 is defined as a magnetic circuit having a main magnetic path which extends from one of magnetic poles of one of adjacent permanent magnets M and M and reaches the other of magnetic poles of the one of adjacent permanent magnets M and M via one of side protruded portions 31a and 31a of the first tooth portion 31 of the tooth portion 30 and the other of adjacent permanent magnets M and M.

As will be understood from the above, the magnetic path of the magnetic short-circuit C2 differs slightly depending on the relative position of the permanent magnet M of the rotor 2 and the first tooth portion 31 of the stator 3. As mentioned above, however, the magnetic short-circuit C2 is defined as a magnetic circuit having a main magnetic path which extends from one of magnetic poles of one of adjacent permanent magnets M and M and reaches the other of magnetic poles of the one of the adjacent permanent magnets via the other of adjacent permanent magnets M and M, without passing through a radially outward portion of the tooth portion 30 excluding a rotor side end portion of a body portion of the first tooth portion 31 and the side protruded portions 31a and 31a of the first tooth portion 31.

As shown in FIG. 5B, the magnetic circuit between permanent magnets C3 is defined as a magnetic circuit C3 having a main magnetic path which extends from one of magnetic poles of one of adjacent permanent magnets M and M and reaches the other of magnetic poles of the one of adjacent permanent magnets M and M via an intermediate region X between the adjacent permanent magnets M and M (the region where the V-shaped cut portion 11 is formed as shown in FIG. 5B), without passing through a radially outward portion of the tooth portion 30 excluding a rotor side end portion and the side protruded portions 31a of the first tooth portion 31.

Specifically, when the rotor 2 and the stator 3 are in a positional relationship as shown in FIG. 5B for example, the magnetic circuit between the permanent magnets C3 is defined as a magnetic circuit having a magnetic path which extends from one of magnetic poles of one of adjacent permanent magnets M and M and reaches the other of magnetic poles of the one of adjacent permanent magnets M and M, without passing through the radially outward portion of the body portion of the first tooth portion 31 via a gap (air gap) between the rotor side end portion of the first tooth portion 31 and the rotor 2 and the intermediate region X between the pair of adjacent permanent magnets M and M.

Also in this case, the magnetic circuit between the permanent magnets C3 slightly differs depending on the relative position of the permanent magnet M of the rotor 2 and the first tooth portion 31 of the stator 3. As mentioned above, however, the magnetic circuit between permanent magnets C3 is defined as a magnetic circuit C3 having a main magnetic path which extends from one of magnetic poles of one of adjacent permanent magnets M and M and reaches the other of magnetic poles of the one of adjacent permanent magnets M and M via an intermediate region X between the adjacent permanent magnets M and M (the region where the V-shaped cut portion 11 is formed as shown in FIG. 5B), without passing through a radially outward portion of the tooth portion 30 excluding a rotor side end portion and the side protruded portions 31a of the tooth portion 30.

In the electric motor according to this embodiment, when the rotor 2 rotates, the flow of the magnetic flux from one of magnetic poles of the permanent magnet M to the other of magnetic poles differs between when the second tooth portion 32 is in the first position in which the second tooth portion 32 as a movable divided tooth portion and the first tooth portion 31 are arranged in a radially aligned manner (see FIG. 5A) and when the second tooth portion 32 is in the second position in which the second tooth portion 32 is moved relative to the first tooth portion 31 (see FIG. 5C).

First, the flow of the magnetic flux which exits from one of magnetic poles of the permanent magnet M and reaches the other of magnetic poles in the first positional state in which the second tooth portion 32 as a movable divided tooth portion and the first tooth portion 31 are arranged in a radially aligned manner (see FIG. 5A) will be explained.

In this state, as explained above, the following relational expression is satisfied: (the total magnetic resistance of the main magnetic circuit C1) (2Rh+2Rk (2Rk1)))<(the total magnetic resistance of the magnetic short-circuit C2 (2Rh+ Rj))≤(the total magnetic resistance of the magnetic circuit between permanent magnets C3 (Rx)). In this state, regardless of the rotational position of the rotor 2, the total magnetic resistance of the main magnetic circuit C1 (2Rh+2Rk (2Rk1)) is small. Therefore, the majority of the magnetic flux exited from one of magnetic poles (i.e., the upper magnetic pole in FIG. 5A) of the permanent magnet M (the right permanent magnet M shown in FIG. 5A) returns to the other of magnetic poles (the lower magnetic pole in FIG. 5A) via the following magnetic path.

Focusing attention on the right permanent magnet M shown in FIG. 5A, the magnetic flux exited from one of magnetic poles (the upper magnetic pole in FIG. 5A) of the permanent magnet M returns to the other of magnetic poles (the lower magnetic pole in FIG. 5A) via the first tooth portion 31 of one of adjacent tooth portions 30 and 30 (the tooth portion 30 positioned in the middle in FIG. 5A), the second tooth portion 32 radially outwardly aligned with the first tooth portion 31, the stator yoke portion 50, the second tooth portion 32 of the other of adjacent tooth portions 30 and 30 (the tooth portion 30 positioned on the left side in FIG. 5A), the first tooth portion 31 of the other of adjacent tooth portions 30 and 30 (the tooth portion 30 positioned on the left side in FIG. 5A) arranged radially inwardly aligned with the second tooth portion 32, and the other of permanent magnets M and M arranged on the left side.

Obviously, other than the aforementioned path, leakage flux exists between the adjacent tooth portions 30 and 30, especially between the side protruded portions 31a and 31a of the adjacent first tooth portions 31 and 31. However, the magnetic resistance between the adjacent tooth portions 30 and 30 and between the side protruded portions 31a and 31a are significantly larger than the magnetic resistance of the main magnetic circuit (2Rh+2Rk), and therefore the leakage flux does not largely exert an influence on the flow of the magnetic flux of the main magnetic circuit C1. Further, on each of both widthwise ends of the permanent magnet M, a connection wall 9 connecting the upper iron core portion and the lower iron core portion arranged outward of the permanent magnet M and inward of the permanent magnet M, respectively, is integrally formed (for example, see FIG. 6A). Although magnetic flux flow always exists in the connection wall 9 regardless of the rotational position of the rotor 2, the magnetic flux flow is saturated and stable. Therefore, the magnetic flux flow does not largely exert an influence on the magnetic flux flow of the main magnetic circuit C1.

Therefore, in a state in which the second tooth portion 32 as a movable divided tooth portion is in the first position in which the second tooth portion 32 and the first tooth portion 31 are arranged in a radially aligned manner (see FIG. 5A), when the rotor 2 rotates, the flow of the magnetic flux which exits from one of magnetic poles of the permanent magnet M and reaches the other of magnetic poles is stable, and therefore the change of the magnetic flux in the permanent magnet M is small. As a result, a loss by Joule heat generated in the permanent magnet M is also small.

Next, the flow of the magnetic flux which exits from one of magnetic poles of the permanent magnet M and reaches the other of magnetic poles in the second positional state in which the second tooth portion 32 as a movable divided tooth portion is moved relative to the first tooth portion 31 (see FIG. 5C) will be explained.

In this state, as explained above, both the following relational expressions are satisfied:

a relational expression: (the total magnetic resistance of the magnetic short-circuit C2) (i.e., 2Rh+Rj)<(the total magnetic resistance of the main magnetic circuit C1) (i.e., 2Rh+2Rk (2Rk2)), and a relational expression: (the total magnetic resistance of the magnetic short-circuit C2) (i.e., 2Rh+Rj)≤(the total magnetic resistance of the magnetic circuit between permanent magnets C3 (i.e., Rx)).

In this second positional state, regardless of the rotational position of the rotor 2, the total magnetic resistance of the magnetic short-circuit C2 (i.e., 2Rh+Rj) is smaller than the total magnetic resistance of the main magnetic circuit C1 (i.e., 2Rh+2Rk(2Rk2)). Therefore, the majority of the magnetic flux exited from one of magnetic poles (the upper side magnetic pole in FIG. 5C) of the permanent magnet M (the center permanent magnet M in FIG. 5C) returns to the other of magnetic poles (the lower side magnetic pole in FIG. 5C) via the path of the magnetic short-circuit C2. Therefore, the following explanation will be made based on FIGS. 6A to 6C which enlarge only the magnetic short-circuit C2 and the vicinity thereof.

As shown in FIGS. 6A to 6C, when the rotor 2 rotates and the permanent magnet M embedded in the outer peripheral portion moves in the circumferential direction, the magnetic flux flow changes when the adjacent end portions of adjacent permanent magnets M and M pass the side protruded portions 31a and 31a of the first tooth portions 31 and 31 in the circumferential direction.

First, in a state in which both the adjacent end portions of adjacent permanent magnets M and M are arranged so as to face the circumferential center of the first tooth portion 31 (not illustrated), for example, the majority of the magnetic flux which exited from one of magnetic poles of the right side permanent magnet M returns to the other of magnetic poles of the right side permanent magnet M via the rotor side end portion of the first tooth portion 31 and the left side permanent magnet M. In this state, some of the magnetic flux which exited from the right side permanent magnet M flows through the connection wall 9 formed at the left side of the right side permanent magnet M from the stator side toward the rotor side (i.e., in the radially inward direction). On the other hand, similarly, some of the magnetic flux which exited from the left side permanent magnet M always flows through the connection wall 9 formed at the right side of the left side permanent magnet M from the rotor side toward the stator side (i.e., in the radially outward direction).

From this state, when the rotor 2 rotates counterclockwise until the right side end portion of the left side permanent magnet M leaves from the left side protruded portion 31a of the right side first tooth portion 31 as shown in FIG. 6A, the magnetic flux which exited from one of magnetic poles of the right side permanent magnet M returns to the other of magnetic poles via the left side protruded portion 31a of the right side first tooth portion 31 and the left side permanent magnet M. Also in this state, some of the magnetic flux always flows through the left side connection wall 9 formed on the left side of the right side permanent magnet M from the stator side toward the rotor side (in the radially inward direction). On the other hand, some of the magnetic flux which exited from the left side permanent magnet M always flows through the right side connection wall 9 formed at the right side of the left side permanent magnet M from the rotor side toward the stator side (in the radially outward direction).

From this state, as shown in FIG. 6B, when the rotor 2 further rotates counterclockwise and is arranged in a state in which the intermediate portion of the adjacent end portions of the right and left permanent magnets M and M, i.e., the V-shaped cut portion 11, is arranged at the intermediate position of the adjacent side protruded portions 31a and 31a of the adjacent first tooth portions 31 and 31, the majority of the magnetic flux which exits from one of magnetic poles of the right side permanent magnet M and returns to the other of magnetic poles forms a magnetic path which passes the left side protruded portion 31a of the right side first tooth portion 31, the right side protruded portion 31a of the left side first tooth portion 31 adjacent to the right side protruded portion 31a of the right side first tooth portion 31, and the left side permanent magnet M. In this state, the main magnetic circuit extends between the adjacent side protruded portions 31a and 31a, and therefore the magnetic resistance thereof becomes larger than the magnetic resistance in the state shown in FIG. 6A. However, a large change in the magnetic flux flow can be controlled because the magnetic short-circuit C2 is secured by the magnetic resistance Rj between the adjacent side protruded portions 31a and 31a. Therefore, the change of the magnetic flux in the permanent magnet M can be controlled even if the state shown in FIG. 6A is changed to the state shown in FIG. 6B.

Also in the state shown in FIG. 6B, some of the magnetic flux which exited form the right permanent magnet M passes through the left side connection wall 9 arranged at the left side of the right side permanent magnet M from the stator side toward the rotor side (in the radially inward direction). On the other hand, through the right side connection wall 9 arranged at the right side of the left side permanent magnet M, some of the magnetic flux which exited from the left side the permanent magnet M flows from the rotor side toward the stator side (in the radially outward direction). The magnetic flux flow flowing through the connection wall 9 is similar to the magnetic flow through the connection wall shown in FIG. 6A, and it is considered that such magnetic flow contributes to controlling of the change in magnetic flux in the permanent magnet M.

Further, from this state, as shown in FIG. 6C, when the rotor 2 further rotates counterclockwise and the left side end portion of the right side permanent magnet M gets closer to the right side protruded portion 31*a* of the left side first tooth portion 31, the magnetic flux which exited from one of magnetic poles of the right side permanent magnet M returns to the other of magnetic poles via the right side protruded portion 31*a* of the left side first tooth portion 31 and the left side permanent magnet M. Also in the state, some of the magnetic flux which exited form the right permanent magnet M passes through the left side connection wall 9 arranged at the left side of the right side permanent magnet M from the stator side toward the rotor side (in the radially inward direction). On the other hand, through the right side connection wall 9 arranged at the right side of the left side permanent magnet M, some of the magnetic flux which exited from the left side permanent magnet M flows from the rotor side toward the stator side (in the radially outward direction). The magnetic flux flow flowing through the connection wall 9 is similar to the magnetic flow through the connection wall shown in FIG. 6A, and it is considered that such magnetic flow contributes to controlling of the change in magnetic flux in the permanent magnet M.

In a state in which the second tooth portion 32 is relatively moved with respect to the first tooth portion 31 and is in the second position (see FIG. 5B), obviously, other than the aforementioned path, leakage flux exists between the adjacent tooth portions 30 and 30. However, the magnetic resistance between the adjacent tooth portions 30 and 30 is significantly larger than the total magnetic resistance Rj of the magnetic short-circuit C2, and therefore the leakage flux does not largely exert an influence on the flow of the magnetic flux of the magnetic short-circuit C2. Also, some of the magnetic flux of the permanent magnet M always flows through the connection wall 9 formed on both sides of the permanent magnet M, but as explained above, the direction of the flow is the same regardless of the rotational position of the rotor 2.

Also, as explained above, in a state in which the second tooth portion 32 is relatively moved with respect to the first tooth portion 31 and is in the second position, the magnetic resistance of the magnetic circuit between the permanent magnets C3, which is defined as a magnetic circuit in which the magnetic flux which exited from one of magnetic poles of the permanent magnet M returns to the other of magnetic poles via the intermediate region X between the adjacent permanent magnets M and M without passing through the radially outward portion of the first tooth portion 31, is equal to or larger than the total magnetic resistance of the magnetic short-circuit C2 (i.e., 2Rh+Rj). Therefore, magnetic flux cannot easily flow through the magnetic circuit between the permanent magnets C3. As a result, the magnetic circuit C3 does not constitute a common magnetic path through which the magnetic fluxes of the adjacent permanent magnets alternatively pass in opposite directions as the rotor 2 like the case in which a connection wall made of the same material as the stator exists in the magnetic circuit C3 between the permanent magnets as shown in FIGS. 9A and 9B. This solves a problem that each permanent magnet M causes a large change of magnetic flux, which in turn can control the change of magnetic flux in the permanent magnets M and M. As a result, a loss by Joule heat due to eddy currents generated in the permanent magnet M can be controlled, which can improve the efficiency as an electric motor and maintain the performance of the motor by preventing deterioration of the coercive force and residual magnetic flux density of the permanent magnet M.

Second Embodiment

An electric rotating machine according to a second embodiment of the present invention is a radial gap type electric motor used as an electric motor for an electric motorcycle. This radial gap type electric motor of this second embodiment is the same in basic structure as the electric motor of the first embodiment except for the structure of mounting permanent magnets at the peripheral surface portion of the rotor 2. Therefore, the following explanation will be mainly directed to the difference.

Figure 7:
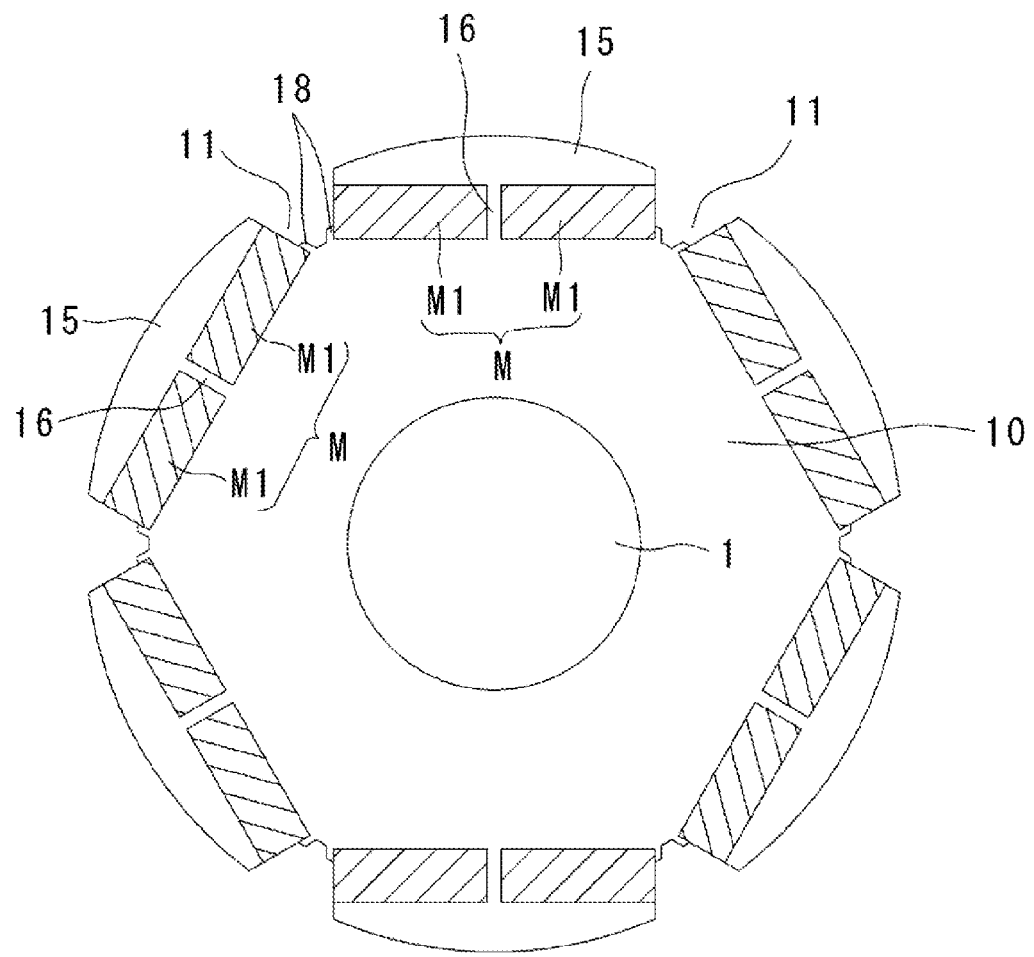
FIG. 7 is a cross-sectional view showing a rotor used for an electric rotating machine according to a second embodiment of the present invention.

In the embodiment, as shown in FIG. 7, each permanent magnet M corresponding to the permanent magnet M in the first embodiment is divided in the circumferential direction of the rotor 2 into two divided permanent magnets M1 and M1 arranged with a space therebtween. At the radially outside of these divided permanent magnets M1 and M1, a holding piece 15 with its outer peripheral surface formed in an arc shape is provided.

This holding piece 15 is integrally connected to the rotational center side of the rotor main body 10 with the central connection wall 16 positioned between the adjacent divided permanent magnets M1 and M1. The holding piece 15 and the central connection wall 16 form a T-shape in cross-section. With these members, both the divided permanent magnets M1 and M1 are fixed to the rotor main body 10 so that the divided permanent magnets M1 and M1 do not fly apart due to the centrifugal force even if the rotor 2 rotates.

Also in this embodiment, a cut portion 11 corresponding to the V-shaped cut portion of the first embodiment is provided, but no connection wall 9 formed at the widthwise end portion of the permanent magnet M in the first embodiment is provided. Thus, the widthwise outer end portion of the divided permanent magnet M1 is exposed to the V-shaped cut portion 11. At the bottom portion of the V-shaped cut portion 11, engaging portions 18 and 18 each protruded radially outwardly and extended along the side portion of each divided permanent magnet M1 are formed. The movement of the divided permanent magnet M1 in the circumferential direction is prevented by the engaging portions 18 and the central connection wall 16. The holding piece 15, the central connection wall 16, and the engaging portion 18 are integrally formed with the rotor main body 10, which can be produced by, for example, punching a thin silicon steel sheet and stacking them. The structure other than the above is the same as the first embodiment and the explanation will be omitted by allotting the same reference numeral to the corresponding portion.

Also in this second embodiment, in a state in which the second tooth portion 32 as a movable divided tooth portion is arranged in the first position, it is configured to satisfy the following relational expressions:

(the total magnetic resistance of the main magnetic circuit C1) (i.e., 2Rh+2Rk (2Rk1))<(the total magnetic resistance of the magnetic short-circuit C2 (2Rh+Rj))≤(total magnetic resistance of the magnetic circuit between permanent magnets C3 (Rx)).

Also, in a state in which the second tooth portion 32 as a movable divided tooth portion is arranged in the second position, it is configured to satisfy both the following relational expressions:

(the total magnetic resistance of the magnetic short-circuit C2) (i.e., 2Rh+Rj)<(the total magnetic resistance of the main magnetic circuit C1) (i.e., 2Rh+2Rk (2Rk2)); and (the total magnetic resistance of the magnetic short-circuit C2) (i.e., 2Rh+Rj)≤(the total magnetic resistance of the magnetic circuit between permanent magnets C3 (i.e., Rx)).

The flow of the magnetic flux which exited from one of magnetic poles of one of the divided permanent magnets M1 and M1 reaches the other of magnetic poles when the rotor 2 rotates in a state in which the second tooth portion 32 is relatively moved with respect to the first tooth portion 31 and is in the second position will be explained.

In this state, as explained above, the following relational expressions are satisfied:

(the total magnetic resistance of the magnetic short-circuit C2) (i.e., 2Rh+Rj)<(the total magnetic resistance of the main magnetic circuit C1) (i.e., 2Rh+2Rk (2Rk2)); and (the total magnetic resistance of the magnetic short-circuit C2) (i.e., 2Rh+Rj)≤(the total magnetic resistance of the magnetic circuit between permanent magnets C3 (i.e., Rx)).

In this second positional state, regardless of the rotational position of the rotor 2, the total magnetic resistance of the magnetic short-circuit C2 (i.e., 2Rh+Rj) is smaller than the total magnetic resistance of the main magnetic circuit C1 (i.e., 2Rh+2Rk). Therefore, the majority of the magnetic flux exited from one of magnetic poles (the right side magnetic pole in FIG. 8A) of the divided permanent magnet M1 (the right side permanent magnet M1 in FIG. 8A) returns to the other of magnetic poles (the left side magnetic pole in FIG. 8A) via the path of the magnetic short-circuit C2. Therefore, the following explanation will be made based on FIGS. 8A to 8C which enlarge only the magnetic short-circuit C2 and the vicinity thereof.

Figure 8A:
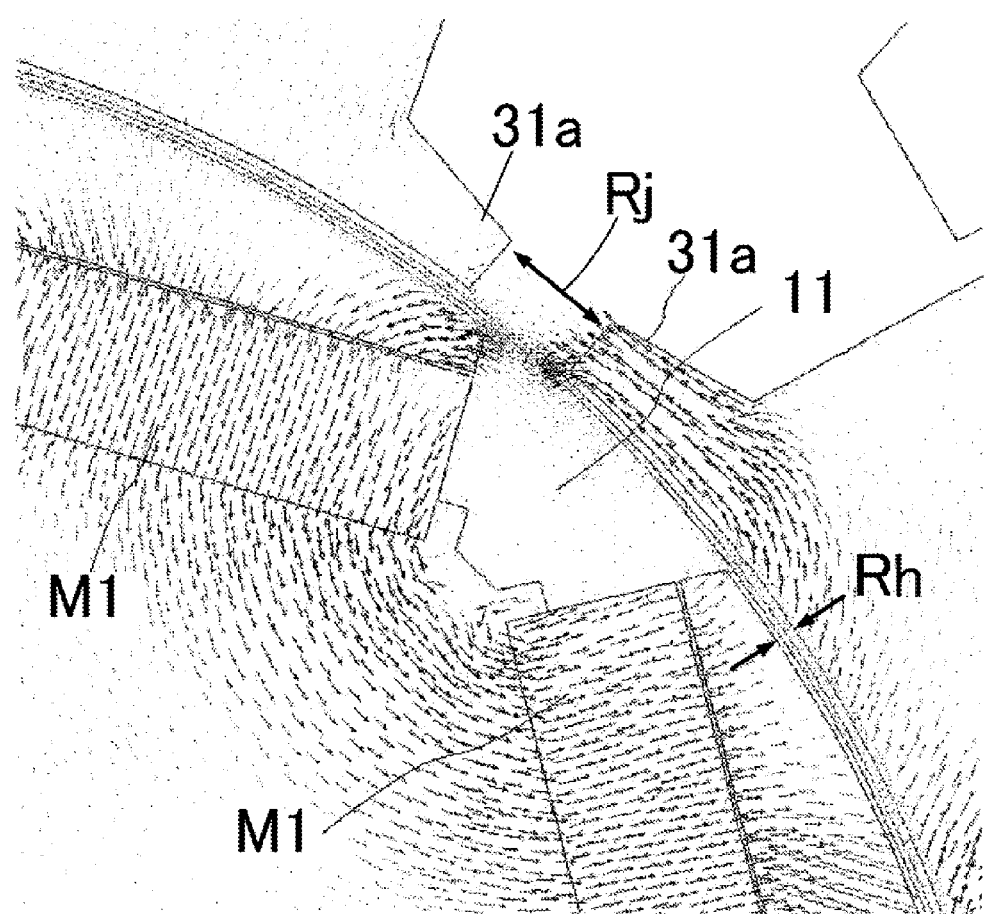
FIG. 8A is an explanatory view showing a magnetic flux flow in a state in which the rotor rotates in a state corresponding to the second position shown in FIG. 4B in the second embodiment.
Figure 8B:
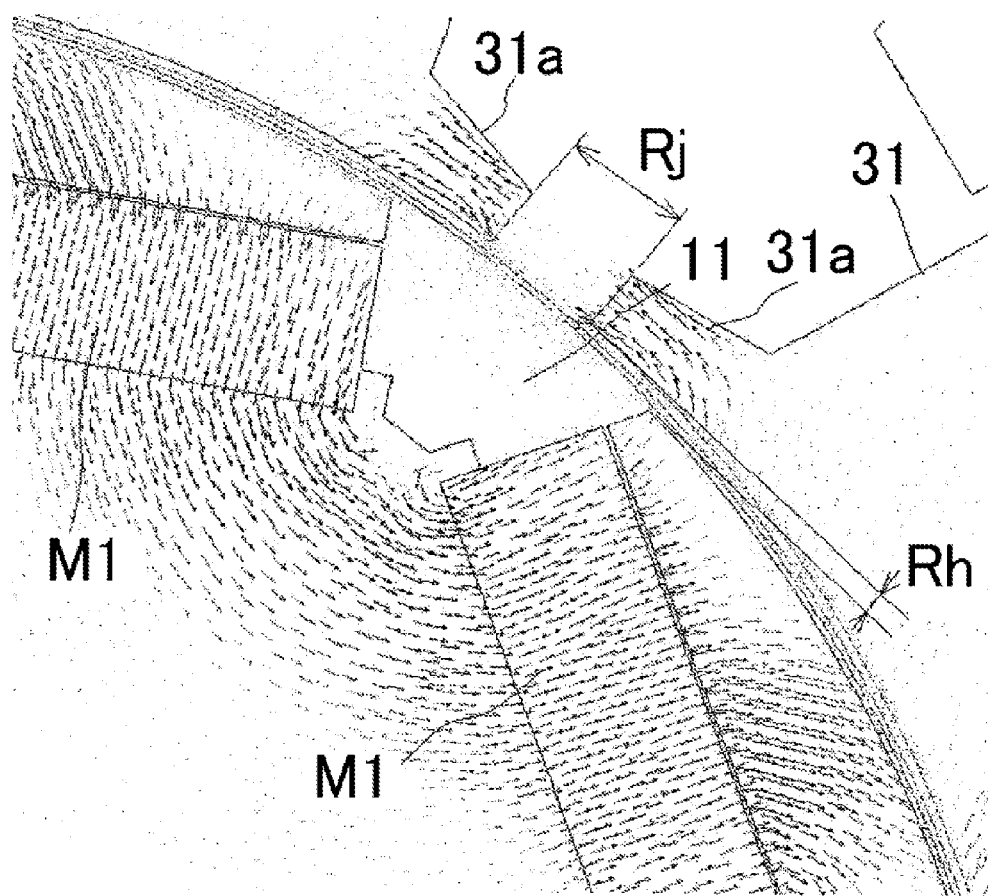
FIG. 8B is an explanatory view showing a magnetic flux flow in a state in which the rotor further rotates counterclockwise from the state shown in FIG. 8A.
Figure 8C:
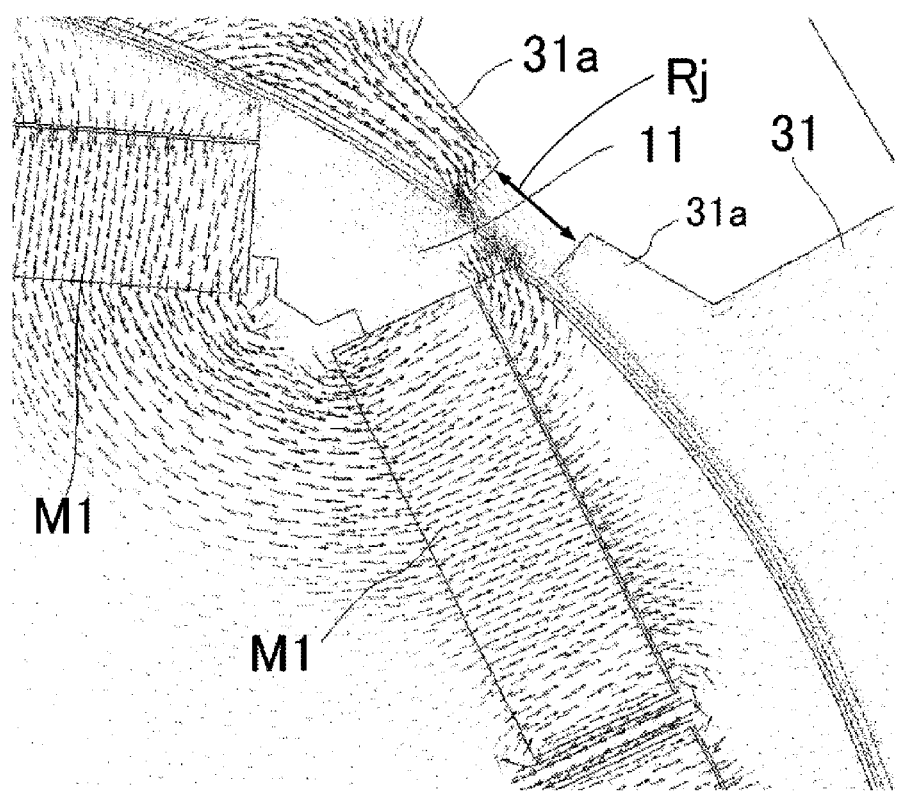
FIG. 8C is an explanatory view showing a magnetic flux flow in a state in which the rotor rotates counterclockwise from the state shown in FIG. 8B.

As shown in FIGS. 8A to 8C, when the rotor 2 having permanent magnets M1 and M1 in the outer peripheral portion rotates, the magnetic flux flow changes when the adjacent end portions of adjacent divided permanent magnets M1 and M1 arranged via the V-shaped cut portion 11 pass the side protruded portions 31a and 31a of the first tooth portions 31 and 31 in the circumferential direction.

First, in a state in which both adjacent end portions of adjacent divided permanent magnets M1 and M1 arranged via the V-shaped cut portion 11 are arranged so as to face the circumferential center of the first tooth portion 31 (not illustrated), the magnetic flux which exited from one of magnetic poles (the magnetic pole on the first tooth portion 31 side) of the right side divided permanent magnet M1 returns to the other of magnetic poles via the first tooth portion 31 and the left side divided permanent magnet M1. In this embodiment, since a connection wall 9 of the first embodiment is not formed in the V-shaped cut portion 11, the magnetic resistance of the magnetic circuit C3 extending between the adjacent divided permanent magnets M1 and M1 via the V-shaped cut portion 11 is large. Therefore, almost no magnetic flux flows through the magnetic circuit between permanent magnets C3. The magnetic fluxes of both the divided permanent magnets M1 and M1 flow through the central connection wall 16 between the adjacent divided permanent magnet M1 and M1, but regardless of the rotational position of the rotor 2, the magnetic flux flow is saturated and nearly steady.

From this state, when the rotor 2 rotates counterclockwise until the right side end portion of the left side divided permanent magnet M1 leaves from the left side protruded portion 31a of the right side first tooth portion 31 as shown in FIG. 8A, the magnetic flux which exited from one of magnetic poles of the right side permanent magnet M returns to the other of magnetic poles via the left side protruded portion 31a of the right side first tooth portion 31 and the left side divided permanent magnet M1 shown in FIG. 8A.

From this state, as shown in FIG. 8B, when the rotor 2 further rotates counterclockwise and is in a state in which the intermediate portion of the adjacent end portions of the right and left divided permanent magnets M1 and M1, i.e., the V-shaped cut portion 11, is arranged at the intermediate position of the adjacent side protruded portions 31a and 31a of the adjacent first tooth portions 31 and 31, the majority of the magnetic flux which exited from one of magnetic poles of the right side divided permanent magnet M returns to the other of magnetic poles forms a magnetic path which passes the left side protruded portion 31a of the right side first tooth portion 31, the right side protruded portion 31a of the left side first tooth portion 31 adjacent to the left side protruded portion 31a of the right side first tooth portion 31, and the left side permanent magnet M1 shown in FIG. 8B. In this state, the main magnetic circuit extends between the adjacent side protruded portions 31a and 31a, and therefore the magnetic resistance thereof becomes larger than the magnetic resistance in the state shown in FIG. 8A. However, a large change in the magnetic flux flow can be controlled because the magnetic short-circuit C2 is secured by the magnetic resistance Rj between the adjacent side protruded portions 31a and 31a. Therefore, the change of the magnetic flux in the permanent magnet M can be controlled even if the state shown in FIG. 8A is changed to the state shown in FIG. 8B.

Further, from this state, as shown in FIG. 8C, when the rotor 2 further rotates counterclockwise and the left side end portion of the right side permanent magnet M1 gets closer to the right side protruded portion 31a of the left side first tooth portion 31, the magnetic flux which exited from one of magnetic poles of the right side permanent magnet M1 returns to the other of magnetic poles via the right side protruded portion 31a of the left side first tooth portion 31 and the left side permanent magnet M.

In a state in which the second tooth portion 32 is relatively moved with respect to the first tooth portion 31 and is in the second position, obviously, other than the aforementioned path, leakage flux exists between the adjacent tooth portions 30 and 30. However, the magnetic resistance between the adjacent tooth portions 30 and 30 is significantly larger than the total magnetic resistance Rj of the magnetic short-circuit C2, and therefore the leakage flux does not largely exert an influence on the flow of the magnetic flux of the magnetic short-circuit C2. Some of the magnetic flux of the permanent magnet M1 always flows through the central connection wall 16 formed between the divided permanent magnets M1 and M1, but the direction of the flow is, as explained above, the same regardless of the rotational position of the rotor 2.

Also, as explained above, in a state in which the second tooth portion 32 is relatively moved with respect to the first tooth portion 31 and is in the second position, the magnetic flux which exited from one of magnetic poles of each divided permanent magnet M1 does not pass the magnetic circuit between the permanent magnets C3 via the V-shaped cut portion 11 because of the following reason. That is, the magnetic resistance Rx of the magnetic circuit between the permanent magnets C3, which is defined as a magnetic circuit in which the magnetic flux which exited from one of magnetic poles of the permanent magnet M1 and M1 returns to the other of magnetic poles via the intermediate region X between the pair of adjacent permanent magnets M1 and M1, is equal to or larger than the total magnetic resistance of the magnetic short-circuit C2 (i.e., 2Rh+Rj). Therefore, magnetic flux cannot easily flow through the magnetic circuit between the permanent magnets C3. As a result, the magnetic circuit C3 does not constitute a common magnetic path through which the magnetic fluxes of the adjacent permanent magnets alternatively pass in opposite directions as the rotor 2 rotates like the case in which a connection wall made of the same material as the stator exists in the magnetic circuit between the permanent magnets C3 as shown in FIGS. 9A and 9B. This can prevent a problem that each permanent magnet M causes a large change of magnetic flux, which in turn can control the change of magnetic flux in the permanent magnets M and M. As a result, a loss by Joule heat due to eddy currents generated in the permanent magnet M can be controlled, which can improve the efficiency as an electric motor and maintain the performance of the motor by preventing deterioration of the coercive force and residual magnetic flux density of the permanent magnet M.

In any of the aforementioned embodiments, an electric rotating machine in which a permanent magnet M formed into a rectangular cross-sectional shape is fitted in a slit having a cross-sectional shape corresponding to the cross-sectional shape of the permanent magnet M and formed in the peripheral portion of the rotor main body is exemplified. However, the present invention is not limited to that, and allows a structure in which a permanent magnet having an arc shaped cross-sectional shape corresponding to the outer circumference of the rotor main body is fixed to the outer circumference of the rotor main body. In this case, the permanent magnet must be tightly fixed so that the permanent magnet does not come off from the rotor main body due to the centrifugal force as the rotor rotates. Also in this case, the connection walls 9 and 16 can be omitted from each of the embodiment, which fully exerts the performance of the permanent magnet because a magnetic short-circuit through which the magnetic flux of the permanent magnet always flows is not formed by the connection wall.

The present invention can be used in place of a conventional field weakening control, but does not prevent the combined use with the conventional field weakening control.

In each embodiment, an electric rotating machine in which permanent magnets are fitted in a plurality of slots formed in the peripheral portion of the rotor main body in the circumferential direction in an embedded manner is exemplified. However, the present invention is not limited to the above. In the present invention, "a plurality of permanent magnets are arranged in a columnar rotor main body in an embedded manner" includes, for example, a case configured such that a rotor main body is constituted by a thin cylindrical body and a columnar body arranged in the cylindrical body and a plurality of permanent magnets are arranged between the cylindrical body and the columnar body in the circumferential direction and all cases in which a plurality of permanent magnets are arranged in a rotor main body in an embedded manner.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to."

This application claims priority under 35 U.S.C.§119 to Japanese Patent Application No. P2011-281393 filed on Dec. 22, 2011 and Japanese Patent Application No. P2012-227652 filed on Oct. 15, 2012, the entire disclosures of which are incorporated herein by reference in its entirety.

INDUSTRIAL APPLICABILITY

The rotary electric machine of the present invention can be used as an electric motor as a driving source for, e.g., various electric vehicles including electric motorcycles, and various electric machines.

The invention claimed is:

1. An electric rotating machine, comprising:
   a rotor having a plurality of permanent magnets, including first and second permanent magnets adjacent each other, embedded in a columnar rotor main body and configured to rotate about a rotation axis; and
   a cylindrical stator arranged outward of the rotor in a radial direction of the rotor so as to face an outer peripheral surface of the rotor main body via a gap, the stator including
      a plurality of tooth portions arranged at intervals in a circumferential direction of the stator, a first and a second of the tooth portions being adjacent each other, each of the plurality of tooth portions including
         a body portion that has a pair of sides arranged opposite each other in the circumferential direction, the pair of sides having rotor side end portions, and
         a pair of side protruded portions protruding in the circumferential direction from the rotor side end portions of the pair of sides,
      a stator yoke portion which forms a stator magnetic path together with the tooth portions,
      windings arranged around the tooth portions, and
      a magnetic resistance changing mechanism configured to change a magnetic resistance of the stator magnetic path by mechanically changing the stator magnetic path,
   wherein the magnetic resistance changing mechanism is configured to mechanically change the stator magnetic path between a first state and a second state in which the magnetic resistance of the stator magnetic path is larger than that of the stator magnetic path in the first state, wherein a main magnetic circuit C1 is defined as a magnetic circuit having a main magnetic path that extends from one of the magnetic poles of the first permanent magnet, and reaches the other magnetic pole of the first permanent magnet via a stator yoke portion side of the first tooth portion, the second tooth portion, and the second permanent magnet, wherein the stator yoke portion side of the first tooth portion is disposed closer to the stator yoke portion than any other side of the first tooth portion, wherein a magnetic short-circuit C2 is defined as a magnetic circuit having a main magnetic path that extends from the one magnetic pole of the first permanent magnet and reaches the other magnetic pole of the first permanent magnet via the second permanent magnet, one of the side protruded portions of the first tooth portion and one of the side protruded portions of the second tooth portion, without passing through the stator yoke portion side of the first tooth portion and a stator yoke portion side of the second tooth portion, wherein a magnetic circuit between permanent magnets C3 is defined as a magnetic circuit having a main magnetic path that extends from the one magnetic pole of the first permanent magnet and reaches the other magnetic pole of the first permanent magnet via the one side protruded portion of the first tooth portion, and an intermediate region between the first and second permanent magnets, without passing through the stator yoke portion side of the first tooth portion and the second tooth portion, wherein in the first state, the following relational expression is satisfied:

a total magnetic resistance of the main magnetic circuit C1<a total magnetic resistance of the magnetic short-circuit C2≤a total magnetic resistance of the magnetic circuit between permanent magnets C3, wherein in the second state, both the following relational expressions are satisfied:

the total magnetic resistance of the magnetic short-circuit C2<the total magnetic resistance of the main magnetic circuit C1, and the total magnetic resistance of the magnetic short-circuit C2≤the total magnetic resistance of the magnetic circuit between permanent magnets C3.

2. The electric rotating machine as recited in claim 1, wherein the plurality of tooth portions are divided at positions in the radial direction so as to form a plurality of divided tooth portions, wherein at least one of the divided tooth portions is a movable divided tooth portion that is movable in the circumferential direction with respect to another of the divided tooth portions, and wherein the movable divided tooth portion is movable in the circumferential direction so that the magnetic resistance of the stator magnetic path changes from the first state to the second state or from the second state to the first state.

3. The electric rotating machine as recited in claim 1, wherein the rotor includes a cut portion formed in an intermediate portion of the rotor main body between the first and second permanent magnets so as to extend radially inwardly from the outer peripheral surface of the rotor main body.

4. The electric rotating machine as recited in claim 3, further comprising:

an outer iron core portion constituting an outer peripheral portion of the rotor main body, that includes the outer peripheral surface, and positioned radially outward of the permanent magnets;

an inner iron portion positioned opposite sides of the outer iron core portion via the permanent magnets; and connection walls for connecting the outer iron core portion and the inner iron portion between an edge portion of the permanent magnets in a circumferential direction of the rotor and in the cut portion.

5. The electric rotating machine as recited in claim 3, wherein each permanent magnet includes a pair of divided permanent magnets divided in a circumferential direction of the rotor, and each pair of divided magnets being arranged apart from each other, wherein each pair of divided magnets is embedded in an outer peripheral portion of the rotor main body, that includes the outer peripheral surface, and arranged inwardly of the outer peripheral surface of the rotor main body, and wherein an outer side end portion of each divided permanent magnet in the circumferential direction of the rotor is exposed to the cut portion.

6. The electric rotating machine as recited in claim 5, wherein the outer peripheral portion of the rotor main body is arranged outward of each permanent magnet in the radial direction and is connected to an inner portion of the rotor main body by a central connection wall extending between the permanent magnets of each pair of divided permanent magnets.

7. The electric rotating machine as recited in claim 1, wherein the rotor includes a plurality of slits each for fitting one of the permanent magnets, the plurality of slits being formed in an outer peripheral portion of the rotor and arranged in a circumferential direction of the rotor, and wherein the permanent magnets are inserted into the slits.

8. A vehicle equipped with the electric rotating machine as recited in claim 1.

9. An electronic equipped with the electric rotating machine as recited in claim 1.

10. An electric rotating machine, comprising:

a rotor having a plurality of permanent magnets embedded in a columnar rotor main body and configured to rotate about a rotation axis; and a cylindrical stator arranged outward of the rotor in a radial direction of the rotor so as to face an outer peripheral surface of the rotor main body via a gap, the stator including a plurality of divided tooth portions arranged at intervals in a circumferential direction of the stator, each of the divided tooth portions including a first tooth portion and a second tooth portion, that are divided from each other at a position in the radial direction, and the first tooth portion faces the outer peripheral surface of the rotor main body via the gap and the second tooth portion is arranged at an outermost portion of the divided tooth portion in the radial direction, a cylindrical stator yoke portion fixed to the second tooth portions, and windings arranged around the divided tooth portions, wherein each of the first tooth portions includes a body portion that has a pair of sides arranged opposite each other in the circumferential direction, and a pair of side protruded portions protruding in the circumferential direction at rotor side end portions of the body portion, wherein for each divided tooth portion
- the divided tooth portion is a first divided tooth portion and a second of the divided tooth portions is adjacent the first divided tooth portion,
- at least one of the first and second tooth portions of the first divided tooth portion is a movable divided tooth portion that is movable in the circumferential direction with respect to the other of the first and second tooth portions,
- the movable divided tooth portion is movable between a first position and a second position in which a magnetic resistance of a magnetic path formed by the first divided tooth portion is larger than a magnetic resistance of a magnetic path formed by the first divided tooth portion in the first position,
- a main magnetic circuit C1 is defined as a magnetic circuit having a main magnetic path which extends from one of magnetic poles of a first of the permanent magnets that is adjacent a second of the permanent magnets, and reaches the other magnetic pole of the first permanent magnet via a stator yoke portion side of the first divided tooth portion, the second divided tooth portion, and the second permanent magnet, wherein the stator yoke portion side of the first divided tooth portion is closer to the stator yoke portion than any other portion of the first divided tooth portion,
- a magnetic short-circuit C2 is defined as a magnetic circuit having a main magnetic path which extends from the one magnetic pole of the first permanent magnet and reaches the other magnetic pole of the first permanent magnet via the second permanent magnet, one of the side protruded portions of the first divided tooth portion and one of the side protruded portions of the second divided tooth portion, without passing through the stator yoke portion side of the first divided tooth portion,
- a magnetic circuit between permanent magnets C3 is defined as a magnetic circuit having a main magnetic path which extends from the one magnetic pole of the first permanent magnet and reaches the other magnetic pole of the first permanent magnet via the one side protruded portion of the first divided tooth portion and an intermediate region between the first and second permanent magnets, without passing through the stator yoke portion side of the first divided tooth portion and the second divided tooth portion,
- when the movable divided tooth portion is in the first position, the following relational expression is satisfied:
    - a total magnetic resistance of the main magnetic circuit C1<a total magnetic resistance of the magnetic short-circuit C2≤a total magnetic resistance of the magnetic circuit between permanent magnets C3,
- when the movable divided tooth portion is in the second position, both the following relational expressions are satisfied:
    - the total magnetic resistance of the magnetic short-circuit C2<the total magnetic resistance of the main magnetic circuit C1, and
    - the total magnetic resistance of the magnetic short-circuit C2≤the total magnetic resistance of the magnetic circuit between permanent magnets C3.

11. The electric rotating machine as recited in claim 10, wherein the rotor includes cut portions that are each formed in an intermediate portion of the rotor main body between adjacent ones of the permanent magnets so as to extend radially inwardly from the outer peripheral surface of the rotor main body.

12. The electric rotating machine as recited in claim 11, further comprising:
- an outer iron core portion constituting an outer peripheral portion of the rotor main body, that includes the outer peripheral surface, and positioned radially outward of the permanent magnets;
- an inner iron portion positioned opposite sides of the outer iron core portion via the permanent magnets; and
- connection walls for connecting the outer iron core portion and the inner iron portion between an edge portion of the permanent magnets in a circumferential direction of the rotor and one of the cut portions.

13. The electric rotating machine as recited in claim 11,
- wherein each of the plurality of permanent magnets includes a pair of divided permanent magnets divided in a circumferential direction of the rotor and arranged apart from each other,
- wherein each of the pairs of divided permanent magnets is embedded in an outer peripheral portion of the rotor main body, that includes the outer peripheral surface, and arranged inwardly of the outer peripheral surface of the outer peripheral portion, and
- wherein an outer side end portion of each divided permanent magnet in the circumferential direction of the rotor is exposed to the cut portion.

14. The electric rotating machine as recited in claim 13,
- wherein the outer peripheral portion of the rotor main body is arranged radially outward of the permanent magnets and is connected to an inner portion of the rotor main body by central connection walls extending between the divided permanent magnets in each pair of the divided permanent magnets.

15. The electric rotating machine as recited in claim 10,
- wherein the rotor includes a plurality of slits for receiving the permanent magnets, the plurality of slits being formed in an outer peripheral portion of the rotor main body and arranged in a circumferential direction of the rotor, and wherein the permanent magnets are inserted into the slits.

16. The electric rotating machine as recited in claim 10,
- wherein for each divided tooth portion the second tooth portion is arranged radially outward of the first tooth portion via a gap therebetween, and
- wherein the second tooth portions are the movable divided tooth portions.

17. The electric rotating machine as recited in claim 10,
- wherein the first positions are defined as a magnetic resistance minimum position in which a magnetic resistance of a magnetic circuit constituted by the plurality of divided tooth portions is at a minimum resistance, and in the first positions the plurality of divided tooth portions are each arranged so that the first and second divided tooth portions are radially aligned,
- wherein the second positions are defined as a magnetic resistance maximum position in which the magnetic resistance of the magnetic circuit constituted by the plurality of divided tooth portions is at a maximum resistance, and in the second positions the movable divided tooth portions are moved in the circumferential direction so that the first and second divided tooth portions are not radially aligned, and wherein the movable divided tooth portions are movable continuously or discontinuously between the first and second positions so that the movable divided tooth portions take a plurality of positions between the magnetic resistance minimum position and the magnetic resistance maximum position.

18. The electric rotating machine as recited in claim 10, wherein for each divided tooth portion, when the movable divided tooth portion is arranged in the first position, the following expression is satisfied:

$(2Rh+2Rk1)<(2Rh+Rj)(Rx)$, and when the movable divided tooth portion is arranged in the second position, both following expressions are satisfied:

$(2Rh+Rj)<(2Rh+2Rk2)$, and $(2Rh+Rj)\leq(Rx)$ wherein:

$Rh$ is defined as a magnetic resistance between an outer peripheral portion of the rotor and the first tooth portion of the first divided tooth portion, $Rk1$ is defined as a magnetic resistance between the first and second tooth portions of the first divided tooth portion when the movable divided tooth portion is in the first position, $Rk2$ is defined as a magnetic resistance between the first and second tooth portions of the first divided tooth portion when the movable divided tooth portion is in the second position, $Rj$ is defined as a magnetic resistance between adjacent side protruded portions of the first and second divided tooth portions, and $Rx$ is defined as a magnetic resistance of an intermediate region between the first and second permanent magnets.

19. The electric rotating machine as recited in claim 10, wherein the permanent magnets are neodymium magnets.

* * * * *